(12) United States Patent
Li et al.

(10) Patent No.: US 12,232,129 B2
(45) Date of Patent: Feb. 18, 2025

(54) USER EQUIPMENT AND BASE STATION INVOLVED IN TIME-DOMAIN SCHEDULING

(71) Applicant: Panasonic Intellectual Property Corporation of America, Torrance, CA (US)

(72) Inventors: Hongchao Li, Langen (DE); Hidetoshi Suzuki, Kanagawa (JP); Quan Kuang, Langen (DE); Ming-Hung Tao, Frankfurt am Main (DE)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 431 days.

(21) Appl. No.: 17/630,871

(22) PCT Filed: Jul. 15, 2020

(86) PCT No.: PCT/EP2020/069961
§ 371 (c)(1),
(2) Date: Jan. 27, 2022

(87) PCT Pub. No.: WO2021/023488
PCT Pub. Date: Feb. 11, 2021

(65) Prior Publication Data
US 2022/0279564 A1    Sep. 1, 2022

(30) Foreign Application Priority Data
Aug. 6, 2019   (EP) .................................... 19190383

(51) Int. Cl.
*H04W 72/23*   (2023.01)
*H04L 1/08*   (2006.01)
(Continued)

(52) U.S. Cl.
CPC ............... *H04W 72/23* (2023.01); *H04L 1/08* (2013.01); *H04W 72/0446* (2013.01); *H04W 72/1263* (2013.01)

(58) Field of Classification Search
CPC ............ H04W 72/23; H04W 72/0446; H04W 72/1263; H04L 1/08
See application file for complete search history.

(56) References Cited

U.S. PATENT DOCUMENTS

2020/0374918 A1* 11/2020 Ang ...................... H04W 72/23

OTHER PUBLICATIONS

Huawei, HiSilicon, "Procedure of cross-slot scheduling for UE power saving," R1-1906006, Agenda Item: 7.2.9.2, 3GPP TSG RAN WG1 #97, Reno, USA, May 13-17, 2019, (Year: 2019).*
(Continued)

*Primary Examiner* — Austin J Moreau
(74) *Attorney, Agent, or Firm* — Seed IP Law Group LLP

(57) ABSTRACT

The present disclosure relates to a user equipment (UE) that comprises a receiver, which receives, from a base station, a minimum cross-slot time-domain scheduling parameter, indicating a minimum amount of slots between a scheduling downlink control information, DCI, and an uplink or downlink transmission scheduled by the scheduling DCI. The minimum cross-slot time domain scheduling parameter is carried by a DCI message. Processing circuitry of the UE determines an updating time at which a previously-received minimum cross-slot time-domain scheduling parameter is to be updated based on the received minimum cross-slot time-domain scheduling parameter and then updates the previously-received minimum cross-slot time-domain scheduling parameter based on the received minimum cross-slot time-domain scheduling parameter at the determined updating time. The updating time is determined based on a message exchanged between the UE and the base station, wherein the
(Continued)

message relates to the DCI message carrying the minimum cross-slot time-domain scheduling parameter.

15 Claims, 13 Drawing Sheets

(51) Int. Cl.
    *H04W 72/0446*     (2023.01)
    *H04W 72/1263*     (2023.01)

(56) References Cited

OTHER PUBLICATIONS

3GPP, "3rd Generation Partnership Project; Technical Specification Group Radio Access Network; Study on Scenarios and Requirements for Next Generation Access Technologies; (Release 15)," 3GPP TR 38.913 V15.0.0, Jun. 2018, 39 pages.

3GPP, "3rd Generation Partnership Project; Technical Specification Group Radio Access Network; NR; NR and NG-RAN Overall Description; Stage 2 (Release 15)," 3GPP TS 38.300 V15.6.0, Jun. 2019, 99 pages.

3GPP, "3rd Generation Partnership Project; Technical Specification Radio Group Access Network; Study on new radio access technology; Radio access architecture and interfaces (Release 14)," 3GPP TR 38.801 V14.0.0, Mar. 2017, 91 pages.

3GPP, "3rd Generation Partnership Project; Technical Specification Group Radio Access Network; NR; Physical channels and modulation (Release 15)," 3GPP TS 38.211 V15.6.0, Jun. 2019, 97 pages.

3GPP, "3rd Generation Partnership Project; Technical Specification Group Services and System Aspects; System Architecture for the 5G System; Stage 2 (Release 16)," 3GPP TS 23.501 V16.1.0, Jun. 2019, 368 pages.

3GPP, "3rd Generation Partnership Project; Technical Specification Group Radio Access Network; NR; Physical layer procedures for control (Release 15)," 3GPP TS 38.213 V15.6.0, Jun. 2019, 107 pages.

3GPP, "3rd Generation Partnership Project; Technical Specification Group Radio Access Network; NR; Multiplexing and channel coding (Release 15)," 3GPP TS 38.212 V15.6.0, Jun. 2019, 101 pages.

3GPP, "3rd Generation Partnership Project; Technical Specification Group Radio Access Network; NR; Medium Access Control (MAC) protocol specification (Release 15)," 3GPP TS 38.321 V15.6.0, Jun. 2019, 78 pages.

Apple Inc., "Cross Slot Scheduling for UE Power Saving," R1-1907346, Agenda Item: 7.2.9.2, 3GPP TSG RAN WG1 #97, Reno, USA, May 13-17, 2019, 10 pages.

Extended European Search Report, dated Feb. 11, 2020, for European Application No. 19190383.0, 8 pages.

Huawei, HiSilicon, "Procedure of cross-slot scheduling for UE power saving," R1-1906006, Agenda Item: 7.2.9.2, 3GPP TSG RAN WG1 #97, Reno, USA, May 13-17, 2019, 12 pages.

International Search Report, mailed Sep. 1, 2020, for International Application No. PCT/EP2020/069961, 3 pages.

MediaTek Inc., "Summary of Cross-slot Scheduling Power-Saving Techniques," R1-1907840, Agenda Item 7.2.9.2, 3GPP TSG RAN WG1 Meeting #97, Reno, NV, USA, May 13-17, 2019, 26 pages.

\* cited by examiner

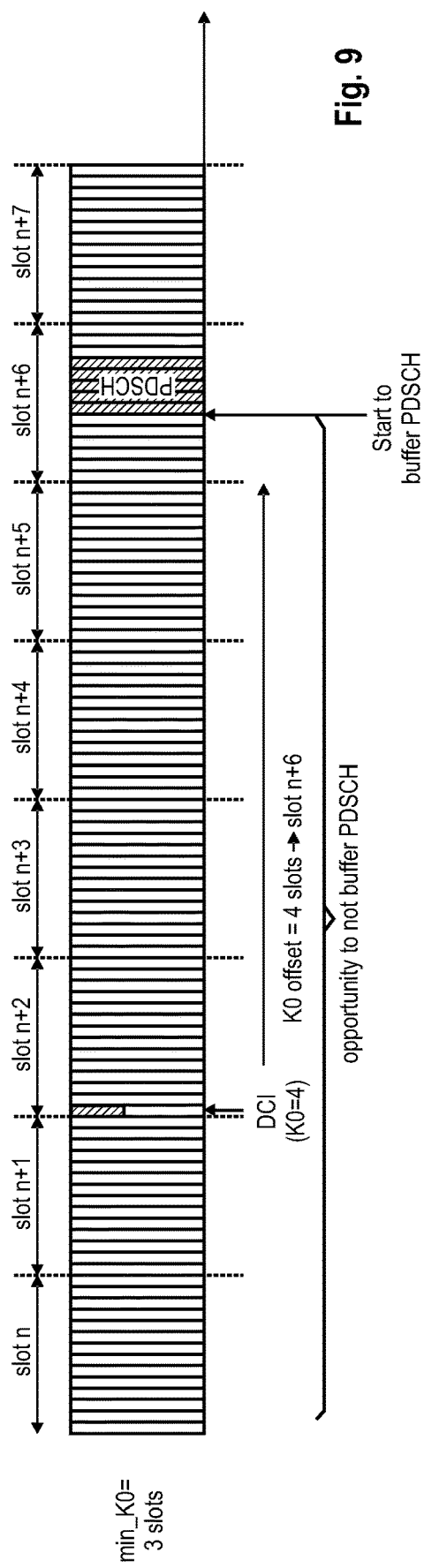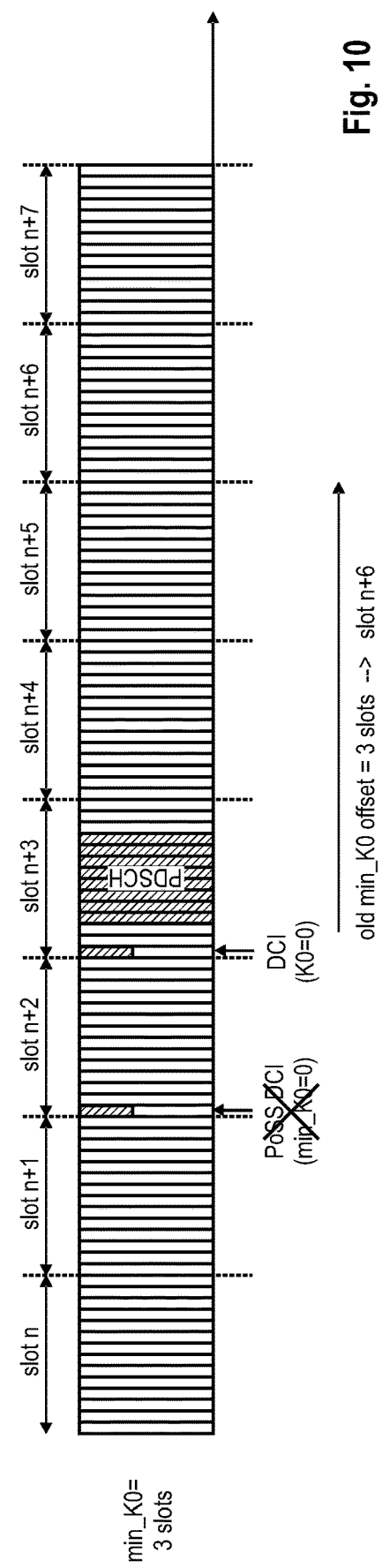

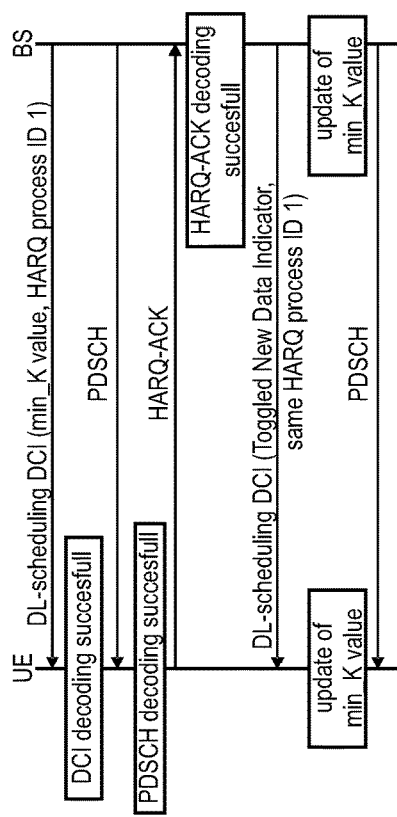
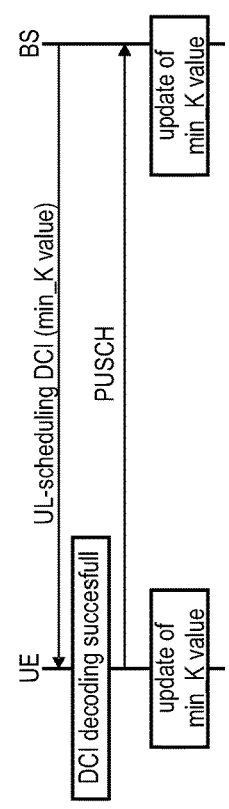
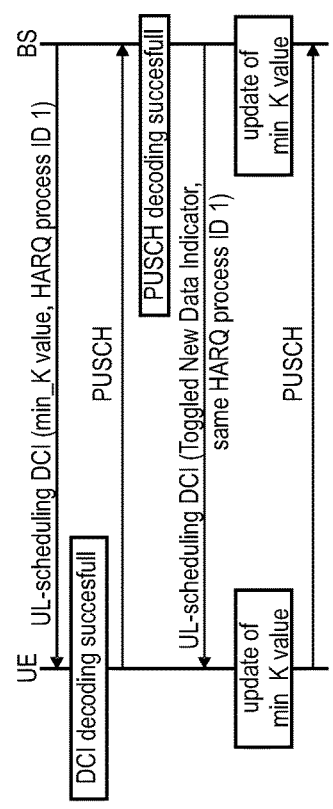
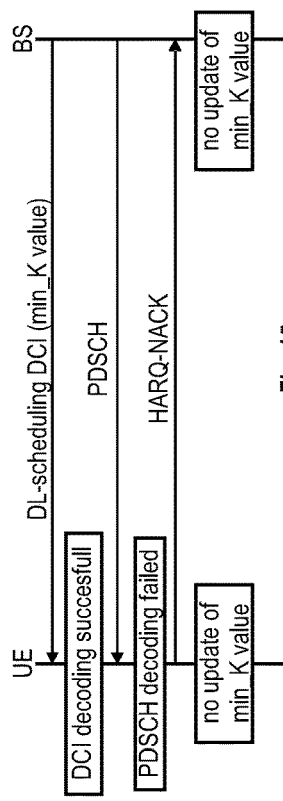
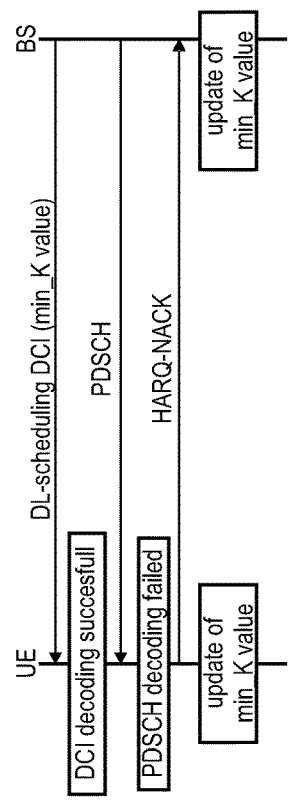
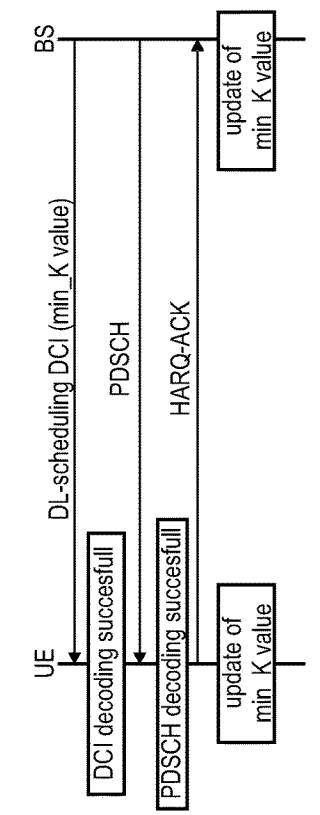

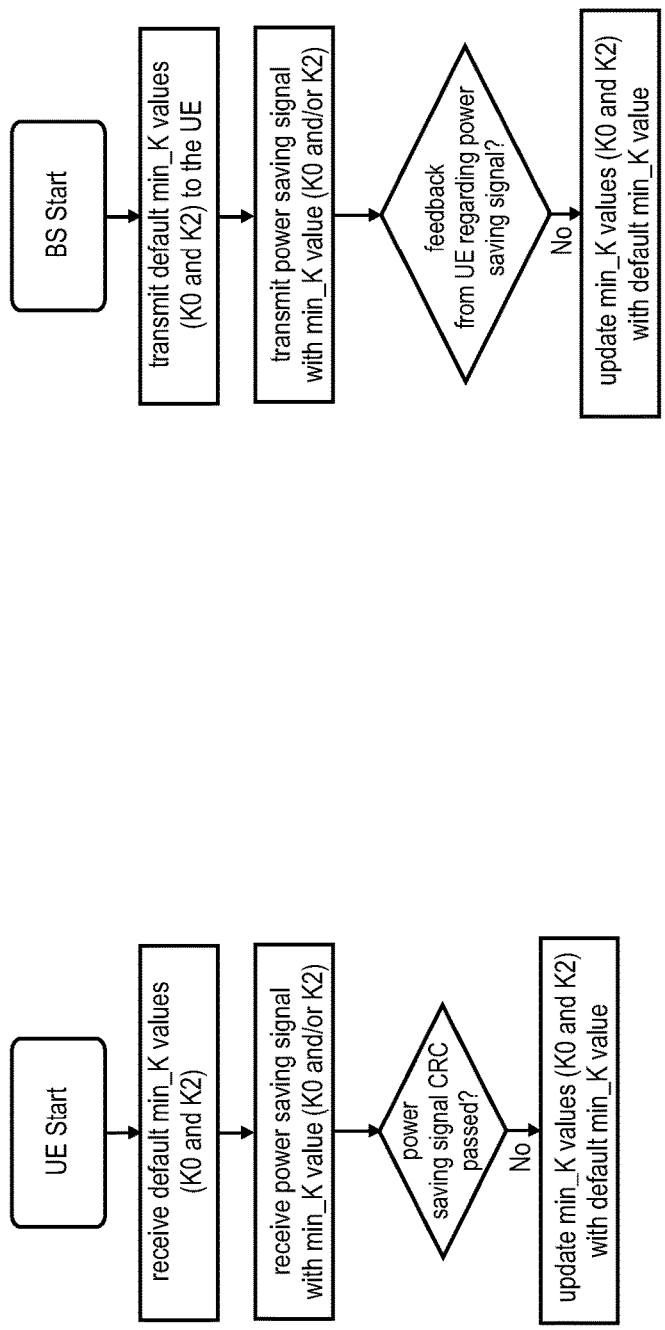
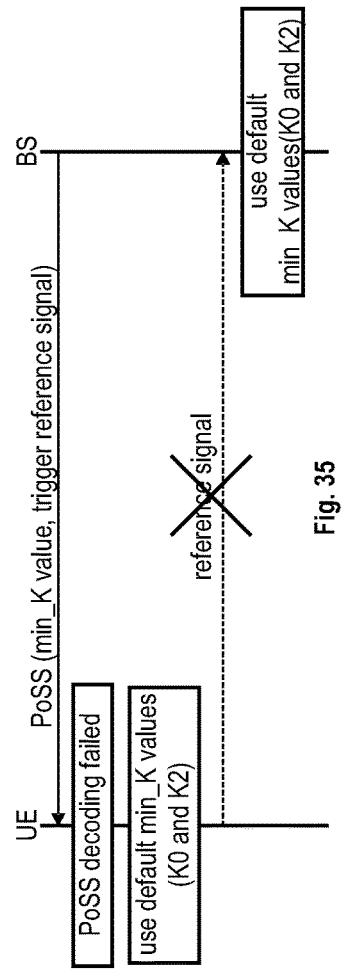
Fig. 33
Fig. 34
Fig. 35

USER EQUIPMENT AND BASE STATION INVOLVED IN TIME-DOMAIN SCHEDULING

BACKGROUND

Technical Field

The present disclosure is directed to methods, devices and articles in communication systems, such as 3GPP communication systems.

Description of the Related Art

Currently, the 3rd Generation Partnership Project (3GPP) works at the technical specifications for the next generation cellular technology, which is also called fifth generation (5G).

One objective is to provide a single technical framework addressing all usage scenarios, requirements and deployment scenarios (see, e.g., section 6 of TR 38.913 version 15.0.0), at least including enhanced mobile broadband (eMBB), ultra-reliable low-latency communications (URLLC), massive machine type communication (mMTC). For example, eMBB deployment scenarios may include indoor hotspot, dense urban, rural, urban macro and high speed; URLLC deployment scenarios may include industrial control systems, mobile health care (remote monitoring, diagnosis and treatment), real time control of vehicles, wide area monitoring and control systems for smart grids; mMTC deployment scenarios may include scenarios with large number of devices with non-time critical data transfers such as smart wearables and sensor networks. The services eMBB and URLLC are similar in that they both demand a very broad bandwidth, however are different in that the URLLC service may preferably require ultra-low latencies.

A second objective is to achieve forward compatibility. Backward compatibility to Long Term Evolution (LTE, LTE-A) cellular systems is not required, which facilitates a completely new system design and/or the introduction of novel features.

BRIEF SUMMARY

One non-limiting and exemplary embodiment facilitates providing procedures for facilitating to improve the time-domain scheduling.

In an embodiment, the techniques disclosed here feature a user equipment comprising a receiver, which receives, from a base station, a minimum cross-slot time-domain scheduling parameter, indicating a minimum amount of slots between a scheduling downlink control information, DCI, and an uplink or downlink transmission scheduled by the scheduling DCI. The minimum cross-slot time domain scheduling parameter is carried by a DCI message. Processing circuitry of the UE determines an updating time at which a previously-received minimum cross-slot time-domain scheduling parameter is to be updated based on the received minimum cross-slot time-domain scheduling parameter and then updates the previously-received minimum cross-slot time-domain scheduling parameter based on the received minimum cross-slot time-domain scheduling parameter at the determined updating time. The updating time is determined based on a message exchanged between the UE and the base station, wherein the message relates to the DCI message carrying the minimum cross-slot time-domain scheduling parameter.

It should be noted that general or specific embodiments may be implemented as a system, a method, an integrated circuit, a computer program, a storage medium, or any selective combination thereof.

Additional benefits and advantages of the disclosed embodiments and different implementations will be apparent from the specification and figures. The benefits and/or advantages may be individually obtained by the various embodiments and features of the specification and drawings, which need not all be provided in order to obtain one or more of such benefits and/or advantages.

BRIEF DESCRIPTION OF THE SEVERAL VIEWS OF THE DRAWINGS

In the following exemplary embodiments are described in more detail with reference to the attached figures and drawings.

FIG. 9 illustrates the timing of a scheduling DCI and scheduled PDSCH and an effect of the minimum cross-slot time-domain scheduling concept, FIG. 10 illustrates the timing of a scheduling DCI, a scheduled PDSCH as well as a missed update of the minimum cross-slot time domain scheduling parameter.

FIG. 15-20 illustrate signaling exchanges and processing sequences at the UE and the BS for different implementations of the improved time-domain scheduling procedure, FIGS. 21 and 22 respectively illustrate flow diagrams for an exemplary UE behavior respectively BS behavior according to an implementation of the improved time-domain scheduling procedure, FIGS. 23 and 24 respectively illustrate flow diagrams for an exemplary UE behavior respectively BS behavior according to an implementation of the improved time-domain scheduling procedure, FIGS. 25 and 26 respectively illustrate flow diagrams for an exemplary UE behavior respectively BS behavior according to an implementation of the improved time-domain scheduling procedure, FIGS. 27 and 28 respectively illustrate flow diagrams for an exemplary UE behavior respectively BS behavior according to an implementation of the improved time-domain scheduling procedure, FIGS. 29 and 30 respectively illustrate flow diagrams for an exemplary UE behavior respectively BS behavior according to an implementation of the improved time-domain scheduling procedure, FIG. 35 illustrates a signaling exchange and processing sequence at the UE and the BS for an implementation of the improved time-domain scheduling procedure, in line with FIGS. 33 and 34.

DETAILED DESCRIPTION

5G NR System Architecture and Protocol Stacks

3GPP has been working at the next release for the 5$^{th}$ generation cellular technology, simply called 5G, including the development of a new radio access technology (NR) operating in frequencies ranging up to 100 GHz. The first version of the 5G standard was completed at the end of 2017, which allows proceeding to 5G NR standard-compliant trials and commercial deployments of smartphones.

Figure 1:
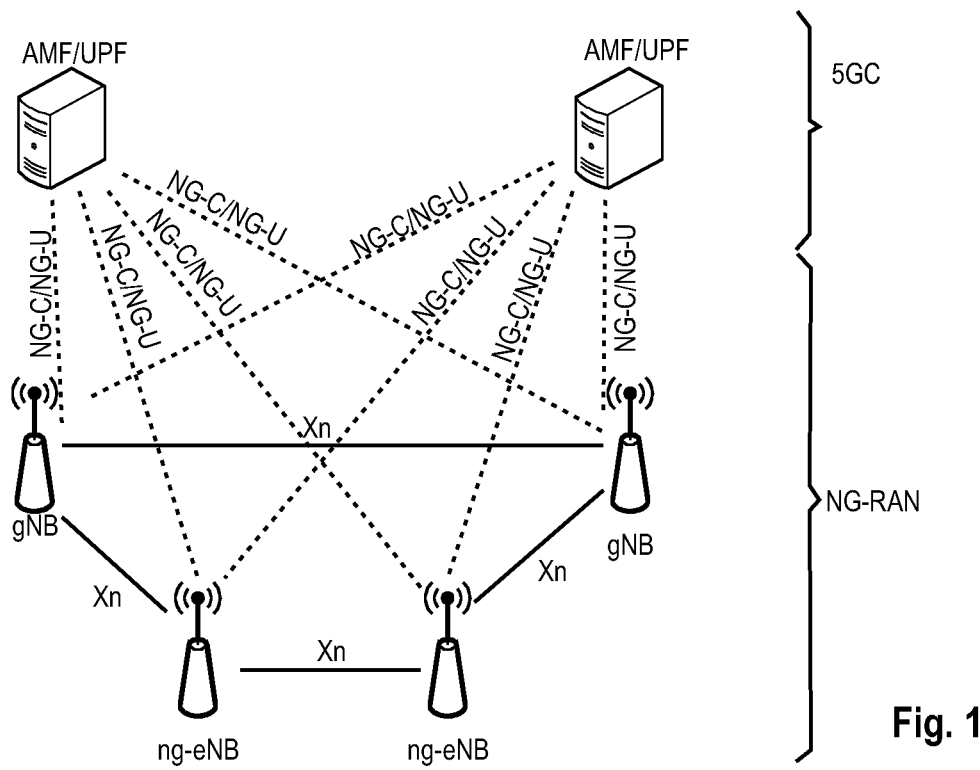
FIG. 1 shows an exemplary architecture for a 3GPP NR system.

Among other things, the overall system architecture assumes an NG-RAN (Next Generation—Radio Access Network) that comprises gNBs, providing the NG-radio access user plane (SDAP/PDCP/RLC/MAC/PHY) and control plane (RRC) protocol terminations towards the UE. The gNBs are interconnected with each other by means of the Xn interface. The gNBs are also connected by means of the Next Generation (NG) interface to the NGC (Next Generation Core), more specifically to the AMF (Access and Mobility Management Function) (e.g., a particular core entity performing the AMF) by means of the NG-C interface and to the UPF (User Plane Function) (e.g., a particular core entity performing the UPF) by means of the NG-U interface. The NG-RAN architecture is illustrated in FIG. 1 (see, e.g., 3GPP TS 38.300 v15.6.0, section 4).

Figure 2:
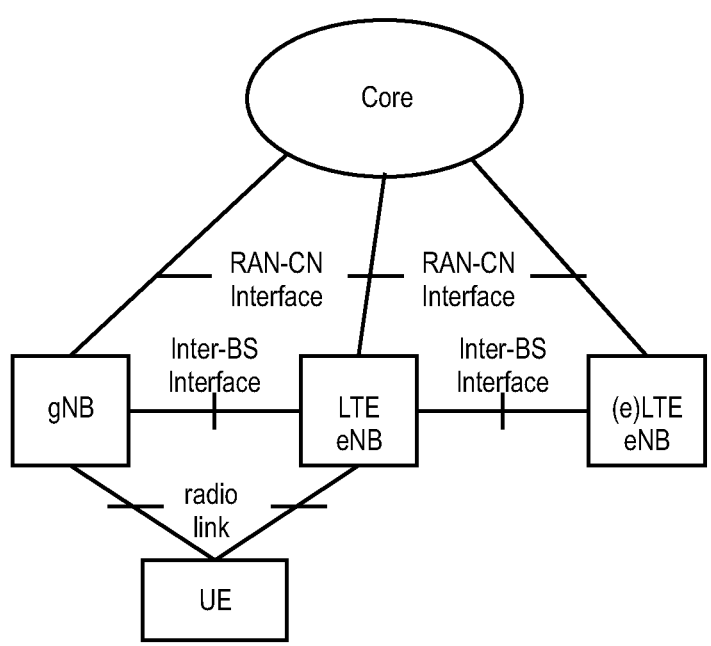
FIG. 2 shows an exemplary user and control plane architecture for the LTE eNB, gNB, and UE.

Various different deployment scenarios can be supported (see, e.g., 3GPP TR 38.801 v14.0.0). For instance, a non-centralized deployment scenario (see, e.g., section 5.2 of TR 38.801; a centralized deployment is illustrated in section 5.4) is presented therein, where base stations supporting the 5G NR can be deployed. FIG. 2 illustrates an exemplary non-centralized deployment scenario (see, e.g., FIG. 5.2.-1 of said TR 38.801), while additionally illustrating an LTE eNB as well as a user equipment (UE) that is connected to both a gNB and an LTE eNB. The new eNB for NR 5G may be exemplarily called gNB. An eLTE eNB is the evolution of an eNB that supports connectivity to the EPC (Evolved Packet Core) and the NGC (Next Generation Core).

The user plane protocol stack for NR (see, e.g., 3GPP TS 38.300, section 4.4.1) comprises the PDCP (Packet Data Convergence Protocol, see section 6.4 of TS 38.300), RLC (Radio Link Control, see section 6.3 of TS 38.300) and MAC (Medium Access Control, see section 6.2 of TS 38.300) sublayers, which are terminated in the gNB on the network side. Additionally, a new access stratum (AS) sublayer (SDAP, Service Data Adaptation Protocol) is introduced above PDCP (see, e.g., sub-clause 6.5 of 3GPP TS 38.300). A control plane protocol stack is also defined for NR (see for instance TS 38.300, section 4.4.2). An overview of the Layer 2 functions is given in sub-clause 6 of TS 38.300. The functions of the PDCP, RLC and MAC sublayers are listed respectively in sections 6.4, 6.3, and 6.2 of TS 38.300. The functions of the RRC layer are listed in sub-clause 7 of TS 38.300.

For instance, the Medium-Access-Control layer handles logical-channel multiplexing, and scheduling and scheduling-related functions, including handling of different numerologies.

The physical layer (PHY) is for example responsible for coding, PHY HARQ processing, modulation, multi-antenna processing, and mapping of the signal to the appropriate physical time-frequency resources. It also handles mapping of transport channels to physical channels. The physical layer provides services to the MAC layer in the form of transport channels. A physical channel corresponds to the set of time-frequency resources used for transmission of a particular transport channel, and each transport channel is mapped to a corresponding physical channel. One physical channel is the PRACH (Physical Random Access Channel) used for the random access.

Use cases/deployment scenarios for NR could include enhanced mobile broadband (eMBB), ultra-reliable low-latency communications (URLLC), massive machine type communication (mMTC), which have diverse requirements in terms of data rates, latency, and coverage. For example, eMBB is expected to support peak data rates (20 Gbps for downlink and 10 Gbps for uplink) and user-experienced data rates in the order of three times what is offered by IMT-Advanced. On the other hand, in case of URLLC, the tighter requirements are put on ultra-low latency (0.5 ms for UL and DL each for user plane latency) and high reliability (1-10$^{-5}$ within 1 ms). Finally, mMTC may preferably require high connection density (1,000,000 devices/km$^2$ in an urban environment), large coverage in harsh environments, and extremely long-life battery for low cost devices (15 years).

Therefore, the OFDM numerology (e.g., subcarrier spacing, OFDM symbol duration, cyclic prefix (CP) duration, number of symbols per scheduling interval) that is suitable for one use case might not work well for another. For example, low-latency services may preferably require a shorter symbol duration (and thus larger subcarrier spacing) and/or fewer symbols per scheduling interval (aka, TTI) than an mMTC service. Furthermore, deployment scenarios with large channel delay spreads may preferably require a longer CP duration than scenarios with short delay spreads. The subcarrier spacing should be optimized accordingly to retain the similar CP overhead. NR may support more than one value of subcarrier spacing. Correspondingly, subcarrier spacing of 15 kHz, 30 kHz, 60 kHz . . . are being considered at the moment. The symbol duration $T_u$ and the subcarrier spacing $\Delta f$ are directly related through the formula $\Delta f = 1/T_u$. In a similar manner as in LTE systems, the term "resource element" can be used to denote a minimum resource unit being composed of one subcarrier for the length of one OFDM/SC-FDMA symbol.

In the new radio system 5G-NR for each numerology and carrier a resource grid of subcarriers and OFDM symbols is defined respectively for uplink and downlink. Each element in the resource grid is called a resource element and is identified based on the frequency index in the frequency domain and the symbol position in the time domain (see 3GPP TS 38.211 v15.6.0).

5G NR Functional Split Between NG-RAN and 5GC

Figure 3:
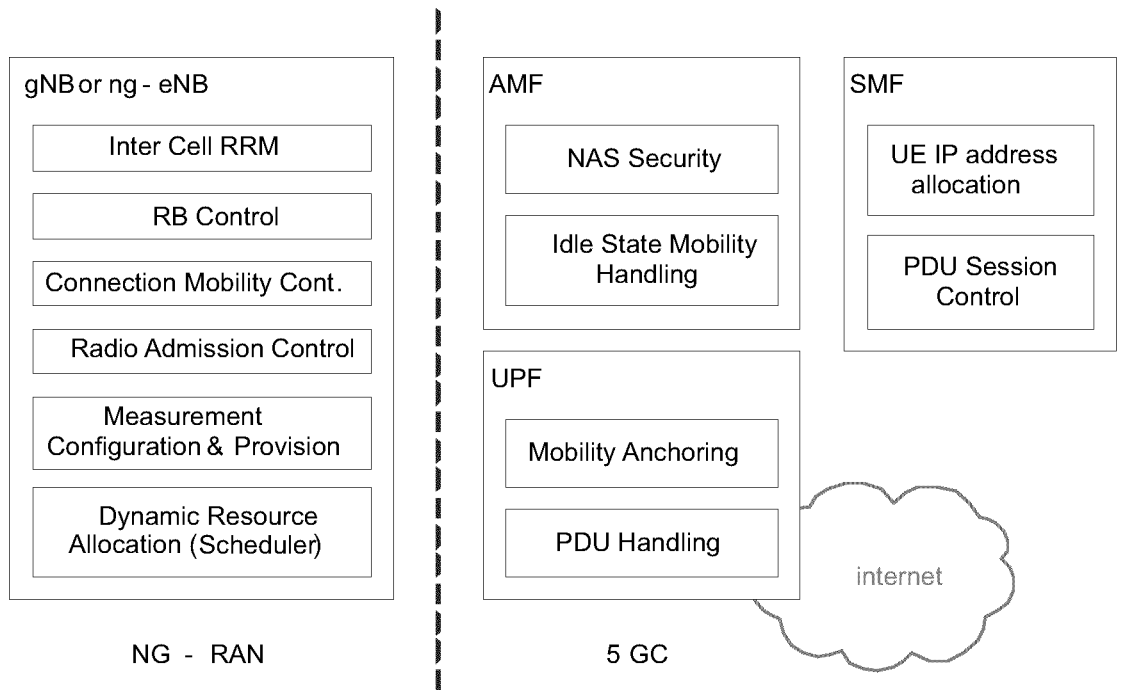
FIG. 3 is a schematic drawing that shows a functional split between NG-RAN and 5GC.

FIG. 3 illustrates functional split between NG-RAN and 5GC. NG-RAN logical node is a gNB or ng-eNB. The 5GC has logical nodes AMF, UPF and SMF.

In particular, the gNB and ng-eNB host the following main functions:
- Functions for Radio Resource Management such as Radio Bearer Control, Radio Admission Control, Connection Mobility Control, Dynamic allocation of resources to UEs in both uplink and downlink (scheduling);
- IP header compression, encryption and integrity protection of data;
- Selection of an AMF at UE attachment when no routing to an AMF can be determined from the information provided by the UE;
- Routing of User Plane data towards UPF(s);
- Routing of Control Plane information towards AMF;
- Connection setup and release;
- Scheduling and transmission of paging messages;
- Scheduling and transmission of system broadcast information (originated from the AMF or OAM);
- Measurement and measurement reporting configuration for mobility and scheduling;
- Transport level packet marking in the uplink;
- Session Management;
- Support of Network Slicing;
- QoS Flow management and mapping to data radio bearers;
- Support of UEs in RRC_INACTIVE state;
- Distribution function for NAS messages;
- Radio access network sharing;
- Dual Connectivity;
- Tight interworking between NR and E-UTRA.

The Access and Mobility Management Function (AMF) hosts the following main functions:
- Non-Access Stratum, NAS, signaling termination;
- NAS signaling security;
- Access Stratum, AS, Security control;
- Inter Core Network, CN, node signaling for mobility between 3GPP access networks;
- Idle mode UE Reachability (including control and execution of paging retransmission);
- Registration Area management;
- Support of intra-system and inter-system mobility;
- Access Authentication;
- Access Authorization including check of roaming rights;
- Mobility management control (subscription and policies);
- Support of Network Slicing;
- Session Management Function, SMF, selection.

Furthermore, the User Plane Function, UPF, hosts the following main functions:
- Anchor point for Intra-/Inter-RAT mobility (when applicable);
- External PDU session point of interconnect to Data Network;
- Packet routing & forwarding;
- Packet inspection and User plane part of Policy rule enforcement;
- Traffic usage reporting;
- Uplink classifier to support routing traffic flows to a data network;
- Branching point to support multi-homed PDU session;
- QoS handling for user plane, e.g., packet filtering, gating, UL/DL rate enforcement;
- Uplink Traffic verification (SDF to QoS flow mapping);
- Downlink packet buffering and downlink data notification triggering.

Finally, the Session Management function, SMF, hosts the following main functions.
- Session Management;
- UE IP address allocation and management;
- Selection and control of UP function;
- Configures traffic steering at User Plane Function, UPF, to route traffic to proper destination;
- Control part of policy enforcement and QoS;
- Downlink Data Notification.

RRC Connection Setup and Reconfiguration Procedures

Figure 4:
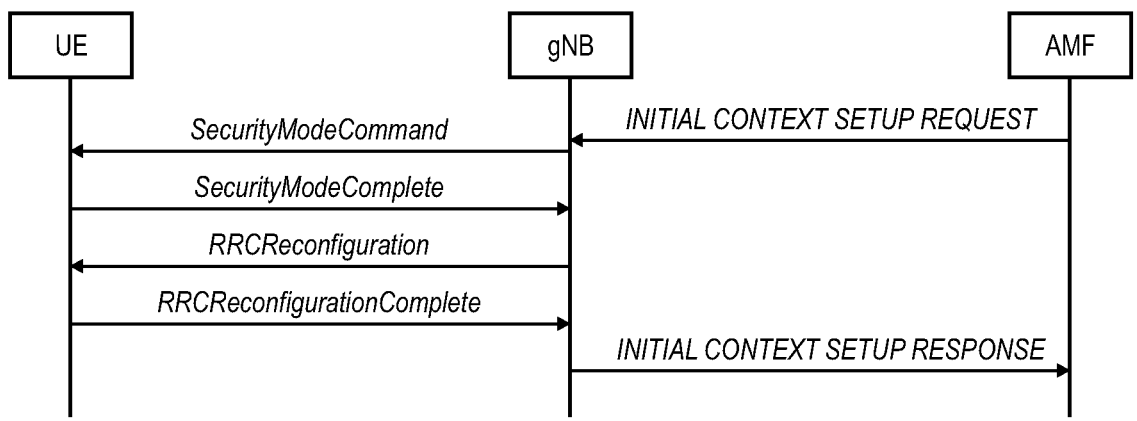
FIG. 4 is a sequence diagram for RRC connection setup/reconfiguration procedures.

FIG. 4 illustrates some interactions between a UE, gNB, and AMF (a 5GC entity) in the context of a transition of the UE from RRC_IDLE to RRC_CONNECTED for the NAS part (see TS 38.300 v15.6.0).

RRC is a higher layer signaling (protocol) used for UE and gNB configuration. In particular, this transition involves that the AMF prepares the UE context data (including, e.g., PDU session context, the Security Key, UE Radio Capability and UE Security Capabilities, etc.) and sends it to the gNB with the INITIAL CONTEXT SETUP REQUEST. Then, the gNB activates the AS security with the UE, which is performed by the gNB transmitting to the UE a SecurityModeCommand message and by the UE responding to the gNB with the SecurityModeComplete message. Afterwards, the gNB performs the reconfiguration to setup the Signaling Radio Bearer 2, SRB2, and Data Radio Bearer(s), DRB(s) by means of transmitting to the UE the RRCReconfiguration message and, in response, receiving by the gNB the RRCReconfigurationComplete from the UE. For a signaling-only connection, the steps relating to the RRCReconfiguration are skipped since SRB2 and DRBs are not setup. Finally, the gNB informs the AMF that the setup procedure is completed with the INITIAL CONTEXT SETUP RESPONSE.

In the present disclosure, thus, an entity (for example AMF, SMF, etc.) of a 5th Generation Core (5GC) is provided that comprises control circuitry which, in operation, establishes a Next Generation (NG) connection with a gNodeB, and a transmitter which, in operation, transmits an initial context setup message, via the NG connection, to the gNodeB to cause a signaling radio bearer setup between the gNodeB and a user equipment (UE). In particular, the gNodeB transmits a Radio Resource Control, RRC, signaling containing a resource allocation configuration information element to the UE via the signaling radio bearer. The UE then performs an uplink transmission or a downlink reception based on the resource allocation configuration.

Usage Scenarios of IMT for 2020 and Beyond

Figure 5:
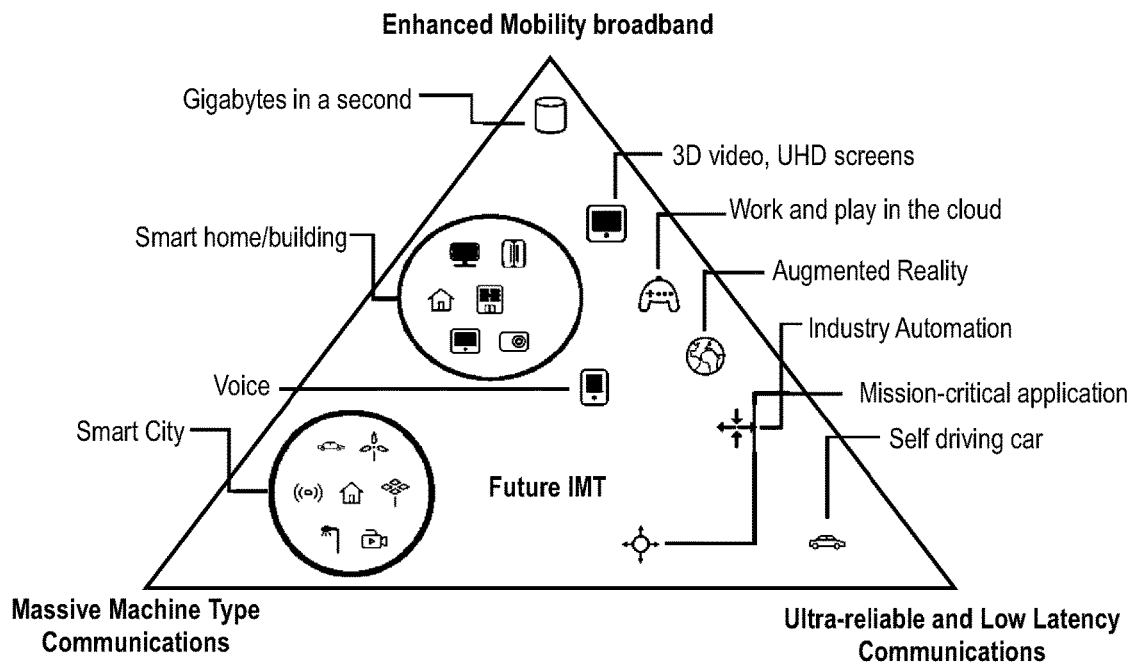
FIG. 5 is a schematic drawing showing usage scenarios of Enhanced mobile broadband (eMBB), Massive Machine Type Communications (mMTC) and Ultra Reliable and Low Latency Communications (URLLC)

FIG. 5 illustrates some of the use cases for 5G NR. In 3rd generation partnership project new radio (3GPP NR), three use cases are being considered that have been envisaged to support a wide variety of services and applications by IMT-2020. The specification for the phase 1 of enhanced mobile-broadband (eMBB) has been concluded. In addition to further extending the eMBB support, the current and future work would involve the standardization for ultra-reliable and low-latency communications (URLLC) and massive machine-type communications. FIG. 5 illustrates some examples of envisioned usage scenarios for IMT for 2020 and beyond.

The URLLC use case has stringent requirements for capabilities such as throughput, latency and availability and has been envisioned as one of the enablers for future vertical applications such as wireless control of industrial manufacturing or production processes, remote medical surgery, distribution automation in a smart grid, transportation safety, etc. Ultra-reliability for URLLC is to be supported by identifying the techniques to meet the requirements set by TR 38.913. For NR URLLC in Release 15, key requirements include a target user plane latency of 0.5 ms for UL (uplink) and 0.5 ms for DL (downlink). The general URLLC requirement for one transmission of a packet is a BLER (block error rate) of 1E−5 for a packet size of 32 bytes with a user plane latency of 1 ms.

From RAN1 perspective, reliability can be improved in a number of possible ways. The current scope for improving the reliability involves defining separate CQI tables for URLLC, more compact DCI formats, repetition of PDCCH, etc. However, the scope may widen for achieving ultra-reliability as the NR becomes more stable and developed (for NR URLLC key requirements). Particular use cases of NR URLCC in Rel. 15 include Augmented Reality/Virtual Reality (AR/VR), e-health, e-safety, and mission-critical applications.

Moreover, technology enhancements targeted by NR URLCC aim at latency improvement and reliability improvement. Technology enhancements for latency improvement include configurable numerology, non slot-based scheduling with flexible mapping, grant free (configured grant) uplink, slot-level repetition for data channels, and downlink pre-emption. Pre-emption means that a transmission for which resources have already been allocated is stopped, and the already allocated resources are used for another transmission that has been requested later, but has lower latency/higher priority requirements. Accordingly, the already granted transmission is pre-empted by a later transmission. Pre-emption is applicable independent of the particular service type. For example, a transmission for a service-type A (URLCC) may be pre-empted by a transmission for a service type B (such as eMBB). Technology enhancements with respect to reliability improvement include dedicated CQI/MCS tables for the target BLER of 1E−5.

The use case of mMTC (massive machine type communication) is characterized by a very large number of connected devices typically transmitting a relatively low volume of non-delay sensitive data. Devices are required to be low cost and to have a very long battery life. From NR perspective, utilizing very narrow bandwidth parts is one possible solution to have power saving from UE perspective and enable long battery life.

As mentioned above, it is expected that the scope of reliability in NR becomes wider. One key requirement to all the cases, and especially necessary for URLLC and mMTC, is high reliability or ultra-reliability. Several mechanisms can be considered to improve the reliability from radio perspective and network perspective. In general, there are a few key potential areas that can help improve the reliability. Among these areas are compact control channel information, data/control channel repetition, and diversity with respect to frequency, time and/or the spatial domain. These areas are applicable to reliability in general, regardless of particular communication scenarios.

For NR URLLC, further use cases with tighter requirements have been identified such as factory automation, transport industry and electrical power distribution, including factory automation, transport industry, and electrical power distribution. The tighter requirements are higher reliability (up to 10−6 level), higher availability, packet sizes of up to 256 bytes, time synchronization down to the order of a few μs where the value can be one or a few μs depending on frequency range and short latency in the order of 0.5 to 1 ms in particular a target user plane latency of 0.5 ms, depending on the use cases.

Moreover, for NR URLLC, several technology enhancements from RAN1 perspective have been identified. Among these are PDCCH (Physical Downlink Control Channel) enhancements related to compact DCI, PDCCH repetition, increased PDCCH monitoring. Moreover, UCI (Uplink Control Information) enhancements are related to enhanced HARQ (Hybrid Automatic Repeat Request) and CSI feedback enhancements. Also PUSCH enhancements related to mini-slot level hopping and retransmission/repetition enhancements have been identified. The term "mini-slot" refers to a Transmission Time Interval (TTI) including a smaller number of symbols than a slot (a slot comprising fourteen symbols).

QoS Control

The 5G QoS (Quality of Service) model is based on QoS flows and supports both QoS flows that require guaranteed flow bit rate (GBR QoS flows) and QoS flows that do not require guaranteed flow bit rate (non-GBR QoS Flows). At NAS level, the QoS flow is thus the finest granularity of QoS differentiation in a PDU session. A QoS flow is identified within a PDU session by a QoS flow ID (QFI) carried in an encapsulation header over NG-U interface.

For each UE, 5GC establishes one or more PDU Sessions. For each UE, the NG-RAN establishes at least one Data Radio Bearers (DRB) together with the PDU Session, and additional DRB(s) for QoS flow(s) of that PDU session can be subsequently configured (it is up to NG-RAN when to do so), e.g., as shown above with reference to FIG. 4. The NG-RAN maps packets belonging to different PDU sessions to different DRBs. NAS level packet filters in the UE and in the 5GC associate UL and DL packets with QoS Flows, whereas AS-level mapping rules in the UE and in the NG-RAN associate UL and DL QoS Flows with DRBs.

Figure 6:
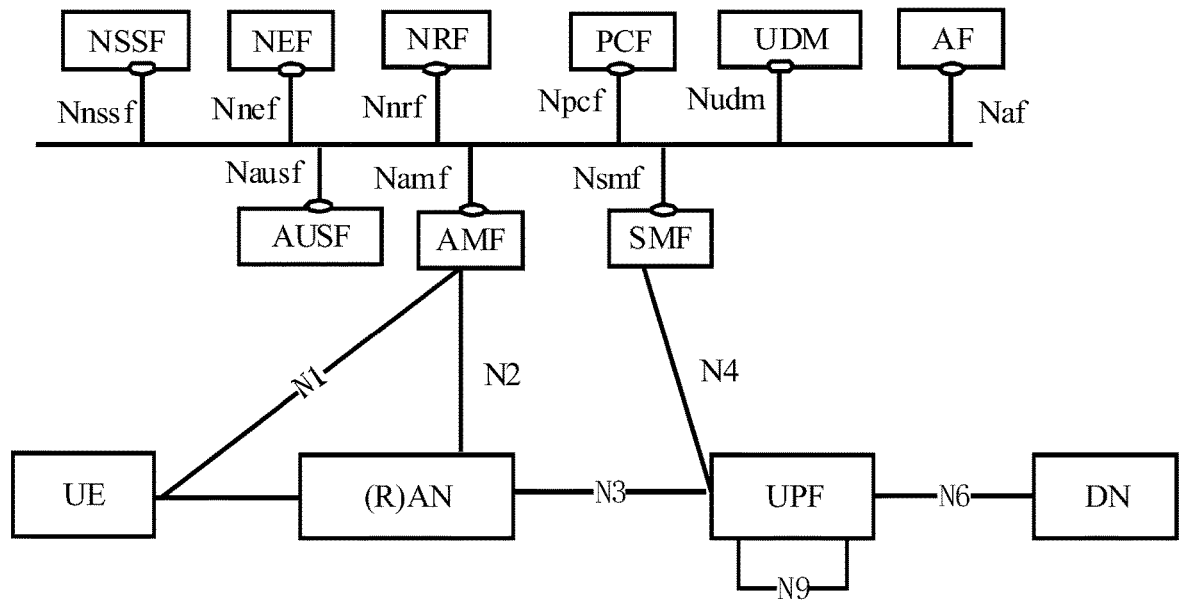
FIG. 6 is a block diagram showing an exemplary 5G system architecture for a non-roaming scenario.

FIG. 6 illustrates a 5G NR non-roaming reference architecture (see TS 23.501 v16.1.0, section 4.23). An Application Function (AF), e.g., an external application server hosting 5G services, exemplarily described in FIG. 5, interacts with the 3GPP Core Network in order to provide services, for example to support application influence on traffic routing, accessing Network Exposure Function (NEF) or interacting with the Policy framework for policy control (see Policy Control Function, PCF), e.g., QoS control. Based on operator deployment, Application Functions considered to be trusted by the operator can be allowed to interact directly with relevant Network Functions. Application Functions not allowed by the operator to access directly the Network Functions use the external exposure framework via the NEF to interact with relevant Network Functions.

FIG. 6 shows further functional units of the 5G architecture, namely Network Slice Selection Function (NSSF), Network Repository Function (NRF), Unified Data Management (UDM), Authentication Server Function (AUSF), Access and Mobility Management Function (AMF), Session Management Function (SMF), and Data Network (DN), e.g., operator services, Internet access or 3rd party services.

Time-Domain Scheduling in 5G NR

In the time domain, NR transmissions are organized into frames of length 10 ms, each of which is divided into 10 equally sized subframes of length 1 ms. A subframe in turn is divided into slots consisting of 14 OFDM symbols each. The duration of a slot in milliseconds depends on the numerology. For instance, for the 15 kHz subcarrier spacing, an NR slot thus has the same structure as an LTE subframe with normal cyclic prefix. A subframe in NR serves as a numerology-independent time reference, which is useful, especially in the case of multiple numerologies being mixed on the same carrier, while a slot is the typical dynamic scheduling unit.

The time-domain allocation for the data to be received or transmitted is dynamically signaled in the DCI, which is useful because the part of a slot available for downlink reception or uplink transmission may vary from slot to slot as a result of the use of dynamic TDD or the amount of resources used for uplink control signaling. Furthermore, the slot in which the transmission occurs also needs to be signaled as part of the time-domain allocation. Although the downlink data in many cases is transmitted in the same slot as the corresponding assignment, this is frequently not the case for uplink transmissions.

When the UE is scheduled to receive PDSCH or transmit PUSCH by a DCI, the Time Domain Resource Assignment (TDRA) field value of the DCI indicates a row index of an allocation table. For instance, the indexed row defines the slot offset K0/K2, the start and length indicator SLIV, or directly the start symbol S and the allocation length L, and the PDSCH mapping type to be assumed in the PDSCH reception. The time-domain allocation field in the DCI is used as an index into an RRC-configurable table from which the actual time-domain allocation is then obtained. There is one table for uplink scheduling grants and one table for downlink scheduling assignments. Up to 16 rows can be configured where each row contains:

- a slot offset (K0, K2), which is the slot relative to the one where the DCI was obtained. At present, slot offsets from 0 to 3 are possible, while for the uplink slot offsets from 0 to 7 can be used.
- The first OFDM symbol in the slot where the data is transmitted.
- The duration of the transmission in number of OFDM symbols in the slot. Not all combinations of start and length fit within one slot. Therefore, the start and length are jointly encoded to cover only the valid combinations.
- For the downlink, the PDSCH mapping type, i.e., the DMRS location is also part of the table. This provides more flexibility compared to separately indicating the mapping type.

It is also possible to configure slot aggregation, i.e., a transmission where the same transport block is repeated across up to 8 slots.

Figure 7:
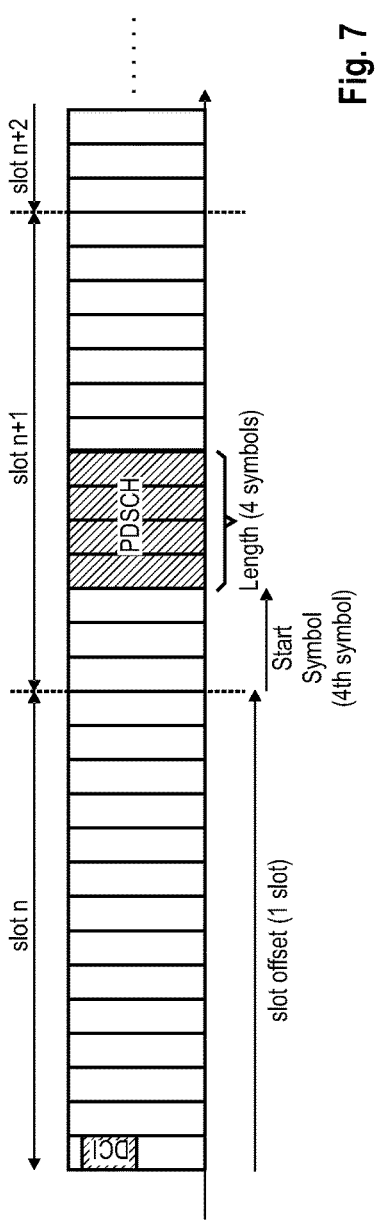
FIG. 7 illustrates an exemplary time-domain scheduling in 5G NR, with cross-slot indication of the DCI in slot n to a scheduled PDSCH in slot n+1, with corresponding start symbol and transmission duration.

An exemplary time-domain scheduling is illustrated in FIG. 7, in which a DL slot offset of 1 slot is indicated in the DCI in slot n, and the scheduled PDSCH is thus transmitted in slot n+1. The starting symbol is the 4th symbol of that slot n+1, and the duration is 4 symbols.

K0 is the slot offset between the scheduling PDCCH and the scheduled PDSCH, i.e., for DL scheduling. K2 is the slot offset between the scheduling PDCCH and the scheduled PUSCH, i.e., for UL scheduling.

The current 3GPP standard TS 38.213 v15.6.0, for instance section 5.1.2 for DL and section 6.1.2 for UL, relates to the time-domain scheduling and provides several default tables that can be used in said respect, e.g., when no RRC configured tables (e.g., pdsch-TimefDomainAllocationList in either pdsch-ConfigCommon or pdsch-Config) are available at the UE. Once these fields (e.g., pdsch-AllocationList) are defined in an RRC message, which elements are used for each PDSCH scheduling is determined by the field called time domain resource assignment in DCI 1_0 and DCI 1_1.

In the following a default PDSCH time domain resource allocation A for normal cyclic prefix is presented.

TABLE 5.1.2.1.1-2

Default PDSCH time domain resource allocation A for normal CP

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 1 | 9 |
|   | 3 | Type A | 0 | 0 | 3 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

As apparent therefrom, the K0 value is always assumed to be 0, in practice applying a same-slot downlink scheduling.

In the following a default PUSCH time domain resource allocation A for normal cyclic prefix is presented.

TABLE 6.1.2.1.1-2

Default PUSCH time domain resource allocation A for normal CP

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

As apparent therefrom, the K2 value is in turn dependent on the parameter j, which is given by the following table.

TABLE 6.1.2.1.1-4

Definition of value j

| $\mu_{PUSCH}$ | j |
|---|---|
| 0 | 1 |
| 1 | 1 |

TABLE 6.1.2.1.1-4-continued

| $\mu_{PUSCH}$ | j |
|---|---|
| 2 | 2 |
| 3 | 3 |

Definition of value j

The parameter $\mu_{PUSCH}$ is the subcarrier spacing configurations for PUSCH.

In the following an example for a RRC-configured TDRA table for the PDSCH is provided, where the parameter K0 varies between 0 and 4 slots.

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 1 | 3 | 8 |
| 4 | 2 | Type A | 1 | 2 | 7 |
|   | 3 | Type A | 1 | 3 | 6 |
| 5 | 2 | Type A | 1 | 2 | 5 |
|   | 3 | Type A | 1 | 3 | 4 |
| 6 | 2 | Type B | 2 | 9 | 4 |
|   | 3 | Type B | 2 | 10 | 4 |
| 7 | 2 | Type B | 2 | 4 | 4 |
|   | 3 | Type B | 2 | 6 | 4 |
| 8 | 2, 3 | Type B | 2 | 5 | 7 |
| 9 | 2, 3 | Type B | 3 | 5 | 2 |
| 10 | 2, 3 | Type B | 3 | 9 | 2 |
| 11 | 2, 3 | Type B | 3 | 12 | 2 |
| 12 | 2, 3 | Type A | 3 | 1 | 13 |
| 13 | 2, 3 | Type A | 4 | 1 | 6 |
| 14 | 2, 3 | Type A | 4 | 2 | 4 |
| 15 | 2, 3 | Type B | 4 | 4 | 7 |
| 16 | 2, 3 | Type B | 4 | 8 | 4 |

Downlink Control Information (DCI)

PDCCH monitoring is done by the UE so as to identify and receive information intended for the UE, such as the control information as well as the user traffic (e.g., the DCI on the PDCCH, and the user data on the PDSCH indicated by the PDCCH).

Control information in the downlink (can be termed downlink control information, DCI) has the same purpose in 5G NR as the DCI in LTE, namely being a special set of control information that, e.g., schedules a downlink data channel (e.g., the PDSCH) or an uplink data channel (e.g., PUSCH). In 5G NR there are a number of different DCI Formats defined already (see TS 38.212 v15.6.0 section 7.3.1). An overview is given by the following table.

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

PDCCH search spaces are areas in the downlink resource grid (time-frequency resources) where a PDCCH (DCI) may be carried. Put broadly, a radio resource region is used by a base station to transmit control information in the downlink to one or more UEs. The UE performs blind decoding throughout the search space trying to find PDCCH data (DCI). Conceptually, the Search Space concept in 5G NR is similar to LTE Search Space, even though there are many differences in terms of the details.

CSI Reports

An NR device can be configured to carry out different measurements, in most cases with corresponding reporting to the network. In general, such a configuration of a measurement and corresponding reporting are done by means of a report configuration. Such a resource configuration may describe a specific quantity or set of quantities to be reported, the downlink resources on which the measurements should be carried out and how the actual reporting is to be carried out.

A report configuration indicates a quantity, for example, includes different combinations of a channel quality indicator (CQI), rank indicator (RI), and precoder matrix indicator (PMI), jointly referred to as channel state information (CSI) (see, e.g., 3GPP TS 38.213 v15.6.0, e.g., section 9.2.5 therein).

The report configuration also describes when and how the reporting should be carried out, which can be periodic, semi persistent, or a periodic. A periodic reporting is explicitly triggered by means of the DCI signaling, more specifically within a CSI request field within the uplink scheduling grant (e.g., DCI format 0-1). The DCI field may consist of up to 6 bits with each configured aperiodic report associated with a specific bit combination. Aperiodic reporting is always done on the scheduled PUSCH and thus requires an uplink scheduling grant.

Uplink SRS

To enable uplink channel sounding, a device can be configured for transmission of sounding reference signals (SRS) (see 3GPP TS 38.213 v15.6.0, e.g., section 7.3). In many respects, SRS can be seen as the uplink equivalent to the downlink CSI—reference signals in the sense that both the CSI-RS and SRS are intended for channel sounding, albeit in different transmission directions. SRS is limited to a maximum of 4 antenna ports. In general, an SRS spans 1, 2 or 4 consecutive OFDM symbols and is located somewhere within the last 6 symbols of a slot. In the frequency domain, an SRS has a so-called "comb" structure, implying that an SRS is transmitted on every Nth subcarrier, where N can take the values of 2 or 4.

HARQ in 5G NR

Hybrid ARQ with soft combining provides robustness against transmission errors. As hybrid-ARQ retransmissions are fast, many services allow for one or multiple retransmissions, and the HARQ mechanism therefore forms an implicit rate-control mechanism. The HARQ protocol is part of the MAC layer, while the physical layer handles the actual soft combining (see 3GPP TS 38.321 v15.6.0 sections 5.3.2 and 5.4.2, 3GPP TS 38.213).

HARQ is not applicable to all types of traffic. For example, broadcast transmissions, where the same information is intended for multiple devices, typically do not rely on HARQ.

The HARQ protocol uses multiple parallel stop-and-wait processes in a similar way to LTE. Upon receipt of a transport block, the receiver tries to decode the transport block and informs the transmitter about the outcome of the decoding operation through a single acknowledgment bit indicating whether the decoding was successful or a retransmission of the transport block is required (Ack/Nack). Clearly, the receiver must know to which HARQ process a received acknowledgment is associated. This is solved by using the timing of the acknowledgment for association with a certain HARQ process or by using the position of the acknowledgment in the HARQ codebook in case of multiple acknowledgments being transmitted at the same time.

An asynchronous HARQ protocol is used for both downlink and uplink, e.g., an explicit HARQ process number is used to indicate which process is being addressed and is explicitly signaled as part of the downlink control information (DCI) to the UE. In an asynchronous HARQ protocol the retransmissions are in principle scheduled similarly to the initial transmissions. The use of an asynchronous uplink protocol, instead of a synchronous one as in LTE, is necessary to support dynamic TDD where there is no fixed uplink/downlink allocation. Up to 16 HARQ processes are supported.

For proper operation of the soft combining at the physical layer, the receiver needs to know when to perform soft combining prior to decoding and when to clear the soft buffer, that is, the receiver needs to differentiate between the reception of an initial transmission (prior to which the soft buffer should be cleared) and the reception of a retransmission. Similarly, the transmitter must know whether to retransmit erroneously received data or transmit new data. This is handled by the new-data indicator for downlink and uplink hybrid ARQ respectively.

In more detail, with regard to the downlink HARQ operation, retransmissions are scheduled in the same way as new data, e.g., they may occur at any time and at an arbitrary frequency location within the downlink cell bandwidth. The scheduling assignment contains the necessary HARQ related control signaling, such as the HARQ process number, new data indicator, as well as information to handle the transmission of the acknowledgment in the uplink such as timing and resource indication information. Upon receiving a scheduling assignment in the DCI, the receiver tries to decode the transport block, possibly after soft combining with previous attempts. Since transmissions and retransmissions are scheduled using the same framework in general, the device needs to know whether the transmission is a new transmission, in which case the soft buffer should be flushed, or a retransmission, in which case soft combining should be performed. Therefore, an explicit new-data indicator is included for the scheduled transport block as part of the scheduling information transmitted in the downlink DCI. The new-data indicator is toggled for a new transport block, that is, it is essentially a single-bit sequence number. Upon reception of a downlink scheduling assignment, the device checks the new-data indicator to determine whether a retransmission or new data is being scheduled, e.g., respectively whether the current transmission should be soft combined with received data currently in the soft buffer for the HARQ process in question, or if the soft buffer should be cleared first. The new data indicator operates on the transport block level. The result of decoding operation—a positive acknowledgment in the case of a successful decoding and a negative acknowledgment in the case often unsuccessful decoding—is sent back to the gNB as part of the uplink control information.

With regard to uplink HARQ, the same asynchronous HARQ protocol is used as in the downlink. The necessary HARQ related information, such as the HARQ process number, new-data indicator, is included in the scheduling grant. To differentiate between new transmissions and retransmissions of data, the new data indicator is used as well, where toggling the new-data indicator relates to a transmission of a new transport block, otherwise a previous transport block for this HARQ process should be retransmitted (in which case the gNB can perform soft combining).

The timing of uplink acknowledgments is more flexibly controlled in 5G NR than in LTE in order to allow TDD deployments. The HARQ timing field in the downlink DCI is used to control the transmission timing of the acknowledgment in the uplink. This 3-bit field is used as an index into an RRC-configured table providing information on when the HARQ acknowledgment should be transmitted relative to the reception of the PDSCH (see 3GPP TS 38.213 v15.6.0 section 9.1). Multiplexing of acknowledgments in the same slot is also possible in 5G NR.

Power-Saving Enhancements—Wake-Up Signal

It is critical to study UE power consumption to ensure that UE power efficiency for 5G NR UEs can be better than that of LTE, and that techniques and designs for improvements are identified and adopted in said respect. 3GPP is currently studying how to save UE power taking into consideration latency and performance in the NR system. For instance, a power saving signal/channel/procedure is used for triggering adaptation of the UE power consumption characteristics.

Among other things, it is studied how to improve the DRX operation. A power saving signal/channel may trigger the UE adaptation to the DRX operation and involves to configure the power saving signal/channel (can also be termed wake-up signal) before or at the beginning of the DRX ON duration to trigger the UE to only wake up when there is DL data arrival. For instance, a UE is not required to wake up at the DRX ON duration at least for PDCCH monitoring, if the power saving signal (wake-up signal) does not instruct the UE to wake up. Optionally, there can be a go-to-sleep signaling used as the indication for allowing the UE to go back to the sleep state after completion of the PDSCH reception during the DRX ON period to further reduce the UE power consumption.

The UE power consumption can be reduced when the number of UE PDCCH monitoring occasions and/or the number of PDCCH blind decoding attempts is reduced. This may be facilitated by using the above-mentioned Wake-Up signal to trigger/skip the PDCCH monitoring.

Some preliminary agreements may have been reached at 3GPP, which, although not mandatory, can be exemplary assumed for the sake of further explanations. For instance, it is assumed that the PoSS is transmitted over the PDCCH, e.g., in the form of a DCI (PoSS DCI). For instance, the PoSS could be transmitted as a PDSCH-scheduling DCI, a PUSCH-scheduling DCI, or as a non-scheduling DCI.

Moreover, if the UE is configured with the PoSS (wake-up signal, e.g., WUS), the UE may (wake up and) monitor the downlink control channel (PDCCH) for the PoSS at a known time offset before the On-Duration period of the DRX cycle; there is no agreement yet on the exact amount of the time offset.

Apart from indicating whether or not to monitor the PDCCH during the next DRX On-Duration(s), there are—at least at present—no other relevant impacts on the DRX procedure.

Other aspects of the PoSS are still under discussion. For instance, the exact structure of the Wake-up signal is not agreed upon.

Figure 8:
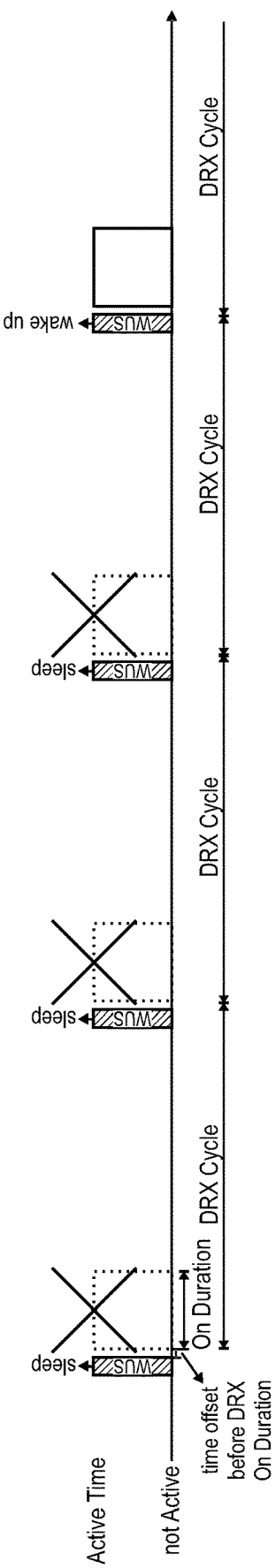
FIG. 8 illustrates an exemplary implementation of the wake-up signal and its effect on the DRX operation and PDCCH monitoring operation at the UE.

FIG. 8 illustrates an exemplary implementation of the PoSS and its effect on the DRX operation as well as the PDCCH monitoring operation at the UE, taking some of the above exemplary assumptions into account. As apparent therefrom, the UE monitors the PDCCH to acquire the PoSS (illustrated as Wake-up signal, WUS) at the appropriate timing (see illustrated "time offset") before the configured On-Duration time period of the DRX function at every DRX cycle. Depending on what the Wake-up signal indicates ("sleep" or "wake up"), the UE then follows the indication either to continue sleeping and thus not monitor the PDCCH during the next DRX On-Duration (WUS illustrated to indicate "sleep" and the On-Duration being illustrated as dotted and crossed out) in case the WUS indicates to not monitor the On-Duration, or to wake up and thus monitor the PDCCH during the next DRX On-Duration (WUS illustrated to "wake up" and the On-Duration illustrated with a full line and not crossed out) in case the WUS indicates to wake up and monitor the PDCCH during the On Duration.

As mentioned above, power saving is critical to UE requirements in the future. The PoSS is one way on how to facilitate reducing the number of times the UE needs to wake-up to monitor the PDCCH during the DRX On-Durations.

Minimum Values for Cross-Slot Time-Domain Scheduling

As explained above with respect to the time-domain scheduling in 5G NR, cross-slot scheduling is achieved by indicating a slot offset (K0 or K2) in a DCI that schedules a DL respectively UL transmission. This operation can be improved by indicating a minimum value for the parameters K0 and K2, for instance called minimum K0/K2 value, min K0 and min K2.

Moreover, it may be exemplarily assumed that the Power Saving Signal/Channel (PoSS) carries minimum K0 parameter and/or minimum K2 parameter. For instance, the PoSS carrying the min_K0 (DL) parameter could be an enhancement of a PDSCH-scheduling DCI, and the PoSS carrying the min_K2 (UL) parameter could be an enhancement of a PUSCH-scheduling DCI. But the PoSS carrying the min_K value (K0 and/or K2) could be an enhancement of a non-scheduling DCI. Although the PoSS is considered in the following for illustration and explanatory purposes to carry the minimum K0 and minimum K2 parameters, the solutions presented herein are not restricted in said respect. In particular, the minimum K0 and K2 parameters can also be carried by another message to the UE.

In particular, the minimum K0/K2 value indicates the minimum value that the K0/K2 parameter can take in subsequent scheduling DCIs can take. Put differently, assuming that the UE is indicated with a minimum K0 value (and/or a minimum K2 value), selecting an entry in the corresponding time-domain resource allocation table (TDRA table) with a K0 (or K2) value smaller than the indicated minimum value is not expected by or not valid for the UE.

Thus, the use of a minimum K0 value effectively allows to limit the usable rows of the TDRA table to a subset of all possible rows.

For instance, when exemplarily assuming the previously-introduced RRC-configured PDSCH TDRA table, the minimum K0 value=2 could have the following effect.

| Row index | dmrs-TypeA-Position | PDSCH mapping type | $K_0$ | S | L |
|---|---|---|---|---|---|
| ~~1~~ | ~~2~~ | ~~Type A~~ | ~~0~~ | ~~2~~ | ~~12~~ |
|  | ~~3~~ | ~~Type A~~ | ~~0~~ | ~~3~~ | ~~11~~ |
| ~~2~~ | ~~2~~ | ~~Type A~~ | ~~0~~ | ~~2~~ | ~~10~~ |
|  | ~~3~~ | ~~Type A~~ | ~~0~~ | ~~3~~ | ~~9~~ |
| ~~3~~ | ~~2~~ | ~~Type A~~ | ~~0~~ | ~~2~~ | ~~9~~ |
|  | ~~3~~ | ~~Type A~~ | ~~1~~ | ~~3~~ | ~~8~~ |
| ~~4~~ | ~~2~~ | ~~Type A~~ | ~~1~~ | ~~2~~ | ~~7~~ |
|  | ~~3~~ | ~~Type A~~ | ~~1~~ | ~~3~~ | ~~6~~ |
| ~~5~~ | ~~2~~ | ~~Type A~~ | ~~1~~ | ~~2~~ | ~~5~~ |
|  | ~~3~~ | ~~Type A~~ | ~~1~~ | ~~3~~ | 4 |
| 6 | 2 | Type B | 2 | 9 | 4 |
|  | 3 | Type B | 2 | 10 | 4 |
| 7 | 2 | Type B | 2 | 4 | 4 |
|  | 3 | Type B | 2 | 6 | 4 |
| 8 | 2, 3 | Type B | 9 | 5 | 7 |
| 9 | 2, 3 | Type B | 3 | 5 | 2 |
| 10 | 2, 3 | Type B | 3 | 9 | 2 |
| 11 | 2, 3 | Type B | 3 | 12 | 2 |
| 12 | 2, 3 | Type A | 3 | 1 | 13 |
| 13 | 2, 3 | Type A | 4 | 1 | 6 |
| 14 | 2, 3 | Type A | 4 | 2 | 4 |
| 15 | 2, 3 | Type B | 4 | 4 | 7 |
| 16 | 2, 3 | Type B | 4 | 8 | 4 |

As apparent therefrom, when exemplary assuming to use K0_min=2, all rows with K0<2 are not to be used anymore (crossed-out in the above table). The UE should expect the gNB to schedule any downlink transmission at least 2 slots after transmitting a DCI. In the above example, the rows 6-16 are valid, such that the UE has to be prepared to be scheduled with such a corresponding slot offset.

Similarly, when exemplary assuming to use K0_min=3, then all rows with K0<3 are not to be used anymore. The UE should expect the gNB to schedule any downlink transmission at least 3 slots after transmitting a DCI. In the above example, the rows 9-16 are valid, such that the UE has to be prepared to be scheduled with such a corresponding slot offset.

The use of the min_K values will also involve an update mechanism that will allow the gNB to update the min_K0 and/or the min_K2 value at the UEs, e.g., by sending same in a DCI (e.g., PoSS DCI) as mentioned above.

The use of a minimum K0/K2 value for the above-described cross-slot scheduling allows saving power. For instance, the PDCCH processing timeline can be more relaxed, because the UE is not required to decode the PDCCH as fast as in the same-slot scheduling case. Particularly, for larger minimum K0/K2 values, the UE does not need to decode the PDSCH in a significant amount of slots.

Further, unlike in the same-slot scheduling case, the UE does not have to buffer all the symbols after the PDCCH. Because the UE knows what is the minimum gap between the PDCCH and the scheduled PDSCH, the UE may skip the PDSCH buffering in some slot(s), e.g., at least in the slots between the current slot (e.g., in which the PDCCH is received) and the slot that is min_K0–1 slots after the current slot.

There is also the potential of allowing a longer micro-sleep period, in case the UE is further not required to monitor the PDCCH during those intermediate slots caused by the minimum gap.

The above-mentioned min_K0 value and advantages will be briefly explained with reference to FIG. 9. FIG. 9 illustrates exemplarily and in a simplified manner the timing of the scheduling DCI and a corresponding scheduled PDSCH and an effect of the minimum K value concept, assuming, e.g., the use of a minimum K0 value. It is exemplarily assumed that the min_K0 value is defined to be 3 slots. Although not illustrated, it may be assumed that the min_K0 value was already configured in the UE, e.g., based on a previously-received PoSS DCI carrying the corresponding min_K0 parameter. The UE thus expects that any scheduling DCI received from the gNB will instruct a PDSCH with a K0 value larger or equal to the min_K0 value, i.e., >=3. The UE when in slot n does not decode a PDCCH and thus knows at this point in time that the earliest slot with a PDSCH could be slot n+4 (i.e., next slot n+1+3-slot offset) and that no PDSCH will be scheduled in slots n, n+1, n+2, n+3. Similarly, the UE, when not decoding a PDCCH in slot n+1, knows at that point in time that the earliest slot with a PDSCH could be slot n+5 (i.e., next slot n+2+3-slot offset) and that no PDSCH will be scheduled in slots n+1, n+2, n+3, n+4. In the present example, the PDCCH for scheduling a downlink transmission is assumed to be received in slot n+2, indicating a cross-slot scheduling parameter K0=4, thus pointing to slot n+6 that will be used to transmit the PDSCH in the downlink. Overall, the UE will thus have the opportunity to not buffer OFDM symbols data from the PDSCH regions between slot n and slot n+5, including the first OFDM symbols of slot n+6 before the actual scheduled PDSCH starts.

On the other hand, without the min_K0 parameter, the UE would need to be prepared to be scheduled in the same slot, i.e., K0=0, where the scheduling DCI and the scheduled PDSCH are received in the same slot. In said case, taking into account the PDCCH processing time, the UE will likely have to buffer the PDSCH for the same slot and possibly for one or more subsequent slots, before determining the actual K0 value. How long the PDCCH decoding takes depends on the UE implementation, e.g., which is restricted by/based on the PDSCH location and/or the total processing timeline budget for PDCCH, PDSCH and HARQ-ACK feedback.

The inventors have identified that for the above minimum cross-slot time-domain scheduling concept to be fully used, it is important that the understanding of the currently assumed minimum values is the same at the UE and the gNB. In other words, a min_K value misalignment between the gNB and the UE, regarding the understanding as to which TDRA table entries are actually applicable, should best be avoided. This also encompasses the support of an update mechanism of the min_K values.

In the following, different misalignment cases will be explained that could lead to disadvantages.

FIG. 10 illustrates exemplarily and in a simplified manner the timing of the scheduling DCI and a corresponding scheduled PDSCH, assuming the use of a minimum K0 value of 3 and then an attempt of an update of the min_K0 value to 0 in slot n+2.

The danger of misalignment exists for instance when the PoSS DCI, being transmitted by the gNB, is not decoded properly at the UE. In that case, the gNB may assume that the UE properly decoded the PoSS DCI and updated the min_K0 value, whereas the UE will continue to use the old min_K0 value for the time-domain scheduling and power saving operation.

The misalignment of the min_K0 value may lead to disadvantages in that the UE does not expect a PDCCH/PDSCH and thus may not have buffered the relevant PDSCH OFDM symbols. This is particularly the case if the newly updated min_K value results in entries of the TDRA table to not be a subset of the previously valid entries. In other words, when the newly updated min_K value is smaller than the previously-valid min_K value. For instance, in FIG. 10 it is assumed that the gNB schedules a PDSCH transmission in slot n+3 by use of the PDCCH DCI in slot n+3, i.e., a same-slot scheduling. When having missed the update of the min_K0 value to 0 (the new min_K value is smaller than the old min_K value; 0<3), the UE may not have buffered the PDSCH OFDM symbols data of slot n+3.

In particular, the UE may finish decoding the scheduling DCI indicating the same-slot PDSCH (K0=0) too late (e.g., because of relaxed processing of the PDCCH) to buffer the PDSCH OFDM symbols of the same slot n+3.

This similarly applies to the update of the minimum K2 value (i.e., used for uplink PUSCH scheduling). In that case, the gNB may assume that the UE properly decoded the PoSS DCI and updated the min_K2 value, whereas the UE will continue to use the old min_K2 value. In that case, the UE may not be in time to transmit the PUSCH, scheduled by the scheduling DCI, in a timely manner.

Consequently, the inventors have identified the possibility to improve the time-domain scheduling procedure performed between the UE and the base station, particularly in connection with the use of the cross-slot mechanism and the use of the minimum K0 and minimum K2 parameters.

In the following, UEs, base stations, and procedures to meet these needs will be described for the new radio access technology envisioned for the 5G mobile communication systems, but which may also be used in LTE mobile communication systems. Different implementations and variants will be explained as well. The following disclosure was facilitated by the discussions and findings as described above and may for example be based at least on part thereof.

In general, it should be noted that many assumptions have been made herein so as to be able to explain the principles underlying the present disclosure in a clear and understandable manner. These assumptions are however to be understood as merely examples made herein for illustration purposes that should not limit the scope of the disclosure. A skilled person will be aware that the principles of the following disclosure and as laid out in the claims can be applied to different scenarios and in ways that are not explicitly described herein.

Moreover, some of the terms of the procedures, entities, layers, etc., used in the following are closely related to LTE/LTE-A systems or to terminology used in the current 3GPP 5G standardization, even though specific terminology to be used in the context of the new radio access technology for the next 3GPP 5G communication systems is not fully decided yet or might finally change. Thus, terms could be changed in the future, without affecting the functioning of the embodiments. Consequently, a skilled person is aware that the embodiments and their scope of protection should not be restricted to particular terms exemplarily used herein for lack of newer or finally agreed terminology but should be more broadly understood in terms of functions and concepts that underlie the functioning and principles of the present disclosure.

For instance, a mobile station or mobile node or user terminal or user equipment (UE) is a physical entity (physical node) within a communication network. One node may have several functional entities. A functional entity refers to a software or hardware module that implements and/or offers a predetermined set of functions to other functional entities of the same or another node or the network. Nodes may have one or more interfaces that attach the node to a communication facility or medium over which nodes can communicate. Similarly, a network entity may have a logical interface attaching the functional entity to a communication facility or medium over which it may communicate with other functional entities or correspondent nodes.

The term "base station" or "radio base station" here refers to a physical entity within a communication network. As with the mobile station, the base station may have several functional entities. A functional entity refers to a software or hardware module that implements and/or offers a predetermined set of functions to other functional entities of the same or another node or the network. The physical entity performs some control tasks with respect to the communication device, including one or more of scheduling and configuration. It is noted that the base station functionality and the communication device functionality may be also integrated within a single device. For instance, a mobile terminal may implement also functionality of a base station for other terminals. The terminology used in LTE is eNB (or eNodeB), while the currently used terminology for 5G NR is gNB.

Figure 11:
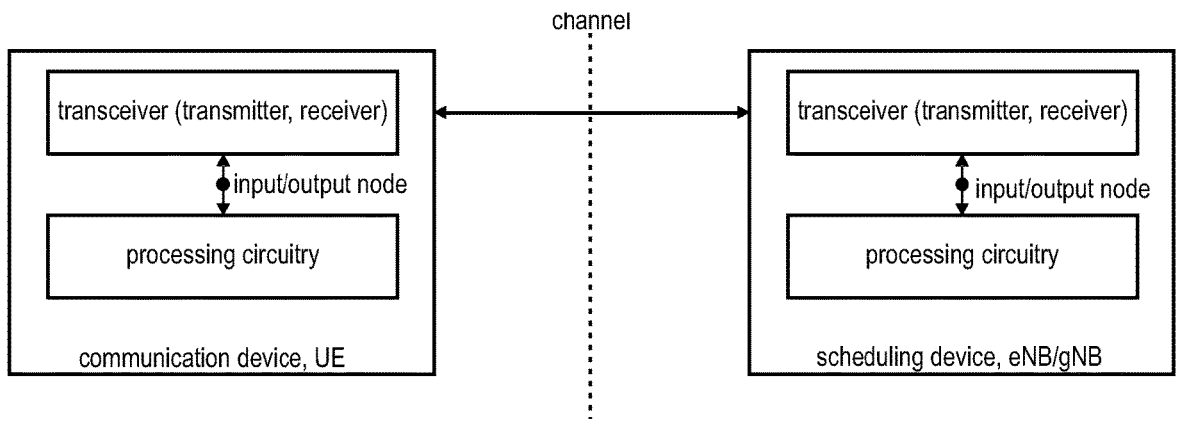
FIG. 11 illustrates the exemplary and simplified structure of a UE and a gNB.

FIG. 11 illustrates a general, simplified and exemplary block diagram of a user equipment (also termed communication device) and a scheduling device (here exemplarily assumed to be located in the base station, e.g., the eLTE eNB (alternatively termed ng-eNB) or the gNB in 5G NR). The UE and eNB/gNB are communicating with each other over a (wireless) physical channel respectively using the transceiver.

The communication device may comprise a transceiver and processing circuitry. The transceiver in turn may comprise and/or function as a receiver and a transmitter. The processing circuitry may be one or more pieces of hardware such as one or more processors or any LSIs. Between the transceiver and the processing circuitry there is an input/output point (or node) over which the processing circuitry, when in operation, can control the transceiver, i.e., control the receiver and/or the transmitter and exchange reception/transmission data. The transceiver, as the transmitter and receiver, may include the RF (radio frequency) front including one or more antennas, amplifiers, RF modulators/demodulators and the like. The processing circuitry may implement control tasks such as controlling the transceiver to transmit user data and control data provided by the processing circuitry and/or receive user data and control data, which is further processed by the processing circuitry. The processing circuitry may also be responsible for performing other processes such as determining, deciding, calculating, measuring, etc. The transmitter may be responsible for performing the process of transmitting and other processes related thereto. The receiver may be responsible for performing the process of receiving and other processes related thereto, such as monitoring a channel.

An improved procedure on how to perform time-domain scheduling will be described in the following.

Figure 12:
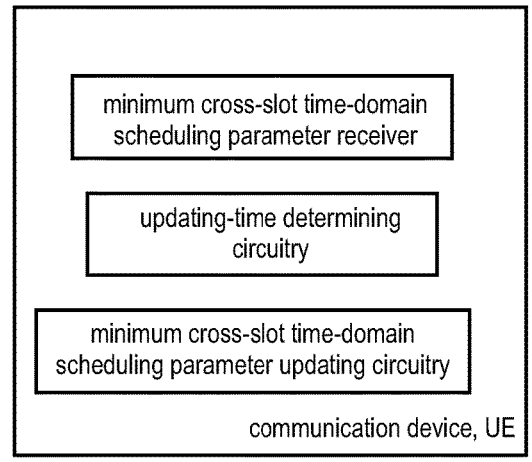
FIG. 12 illustrates a structure of the UE according to an exemplary implementation of an FIG. 13 is a flow diagram for the behavior of a UE, according to an exemplary implementation for an improved time-domain scheduling procedure.

FIG. 12 illustrates a simplified and exemplary UE structure according to one solution of the improved procedure, and can be implemented based on the general UE structure explained in connection with FIG. 11. The various structural elements of the UE illustrated in said figure can be interconnected between one another, e.g., with corresponding input/output nodes (not shown), e.g., in order to exchange control and user data and other signals. Although not shown for illustration purposes, the UE may include further structural elements.

As apparent from FIG. 12, the UE may include a minimum cross-slot time-domain scheduling parameter receiver, an updating-time determining circuitry, and a minimum cross-slot time-domain scheduling parameter updating circuitry.

In the present case as will become apparent from the below disclosure, the processing circuitry can thus be exemplarily configured to at least partly perform one or more of determining an updating time at which a minimum cross-slot time-domain scheduling parameter is to be updated, updating the minimum cross-slot time-domain scheduling parameter, determining the different cases and criteria for determining whether to update at all and for determining the updating time, etc.

The receiver can thus be exemplarily configured to at least partly perform one or more of receiving a minimum cross-slot time-domain scheduling parameter, receiving downlink control information, receiving a downlink transmission, scheduled by a received downlink control information, etc.

The transmitter can thus be exemplarily configured to at least partly perform one or more of transmitting positive/negative feedback of a retransmission protocol to the base station regarding a decoded downlink transmission, transmitting an uplink transmission, etc.

For the following description of the improved time-domain scheduling procedure, it is assumed that the UE supports the use of a minimum cross-slot time-domain scheduling parameter (e.g., called min_K value; can be, e.g., the K0 value for uplink time-domain scheduling, and/or the K2 value for downlink time-domain scheduling), e.g., as being currently under discussion at 3GPP as explained above. In the following, the description will be generally described using the min_K value terminology, which should be however understood to cover the cases where the min_K value is the min_K0 value (DL minimum cross-slot time-domain scheduling parameter) or the min_K2 value (UL minimum cross-slot time-domain scheduling parameter) or both of the min_K0 and min_K2 values.

The min_K value is configured in the UE, e.g., by the base station, and can be updated by the base station when needed, e.g., using the PoSS DCI as explained above.

Figures 13, 14:
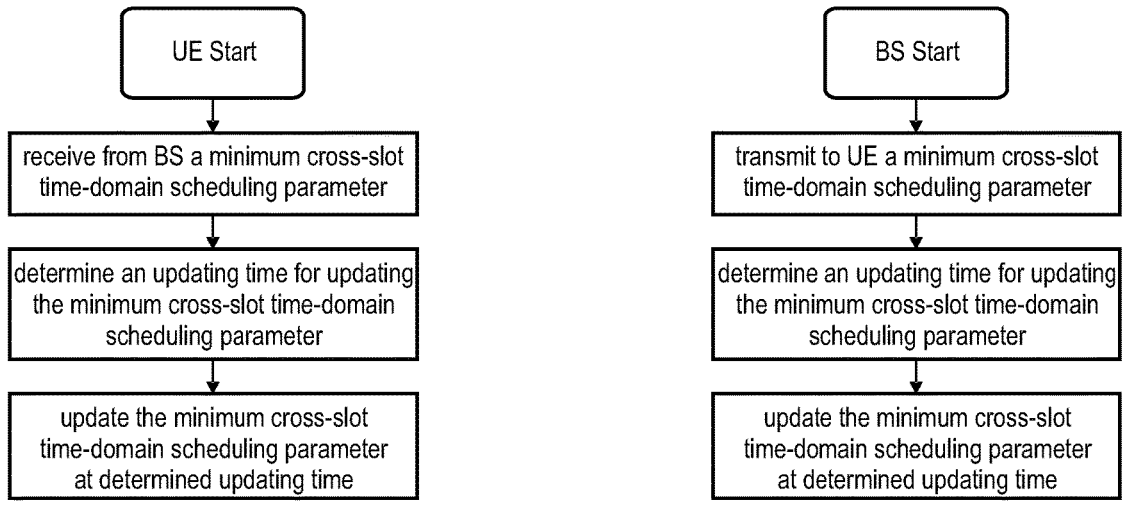
FIG. 14 is a flow diagram for the behavior of a base station, according to an exemplary implementation for an improved time-domain scheduling procedure.

FIG. 13 is a sequence diagram for an exemplary UE behavior according to the improved time-domain scheduling procedure, which will be described in more detail in the following.

In the improved time-domain scheduling procedure, the UE, when receiving a min_K value from the base station determines an updating time (a UE updating time) at which the currently configured min_K value is actually to be updated to the newly-received min_K value. In other words, the UE does not necessarily immediately update the min_K value when receiving same from the BS, but determines whether to update at all and, if so, determines the updating time of the min_K value based on different criteria and circumstances. The UE will perform the updating of the min_K value at an updating time that facilitates to avoid misalignment of the min_K value(s) at the UE and at the base station.

FIG. 14 is a sequence diagram for an exemplary base station behavior according to the improved time-domain scheduling procedure. The base station performs processes of the improved time-domain scheduling procedure that correspond to those performed at the UE. For instance, the base station transmits the minimum cross-slot time-domain scheduling parameter to the UE. Then, the base station determines an updating time (a BS updating time) at which the currently configured min_K value is actually to be updated to the newly transmitted min_K value. In other words, the base station does not necessarily immediately update the min_K value when transmitting same to the UE, but determines whether to update at all, and, if so, determines the BS updating time based on several criteria and circumstances. The base station will perform the updating of the min_K value at the determined BS updating time.

In order to facilitate avoiding the min_K value misalignment between the BS and UE, the BS updating time and the UE updating time should be synchronized as much as possible. As mentioned above, the determination of the respective updating times at the UE and the base station may also encompass whether the UE, respectively the BS, perform the update of the min_K value at all. For instance, there may be cases where the min_K value update is best not to be performed so as to avoid min_K value misalignment, as will become apparent from the below discussion.

The update of the min_K values at the base station and the UE will follow one or more specific rules in order to facilitate achieving the synchronization of the update of the min_K value at the UE and the base station. The different sets of rules presented in the following (e.g., no min_K value update when DCI decoding successful but PDSCH decoding failed, see FIG. 15) allow handling certain scenarios, and there are sets of rules for the UE and the gNB that are coordinated between one another so as to facilitate avoiding the misalignment of the min_K values. However, not all of the different sets of rules, for instance for a UE, need not be implemented. Rather, the different sets of rules should be considered as being standalone sets of rules for handling certain one or more scenarios, which can but need not be combined in the UE. The same applies to the corresponding BS behavior, in which the respective sets of rules for the BS can but need not be combined in the BS.

In general, the improved time-domain scheduling benefits from the use of feedback signaling that is related to the instruction to update the min_K value or more broadly to the DCI message carrying the instruction to update the min_K value, transmitted between the UE and the BS. By using this inter-entity communication (e.g., between the UE and the BS), one entity can derive whether the min_K value has been properly updated or not by the other entity. Put differently, the updating of the min_K value(s), including whether to update and determining the updating time can be based on a message exchanged between the UE and the BS, the exchanged message relating to the DCI message carrying the min_K value update instruction.

In particular, this inter-entity feedback communication (e.g., its presence or absence) may be, e.g.:
  HARQ feedback from the UE to the BS, relating to the correct/incorrect reception of the DCI carrying the min_K value update instruction,
  the PUSCH transmission from the UE to the BS, scheduled by the DCI, carrying the min_K value update instruction,
  another scheduling DCI from the BS to the UE that is sent by the BS after the previous scheduling DCI carrying the min_K value update instruction was successful in scheduling a downlink transmission (PDSCH) or an uplink transmission (PUSCH), where the new scheduling DCI uses the same HARQ process ID as the previous scheduling DCI carrying the min_K value update instruction,
  a reference signal from the UE to the BS, triggered by the DCI carrying the min_K value update instruction,
  a report from the UE to the BS, triggered by the DCI carrying the min_K value update instruction.

More details on these exchanged messages (Inter-entity feedback) will be presented below.

Moreover, in the following the improved time-domain scheduling procedure depends on whether a message is correctly received or not. the correct reception or decoding of a message between the UE and the BS can be, e.g., derived from whether or not the corresponding CRC (Cyclic Redundancy Check) is passed or not. When the CRC is passed, the corresponding transmission has been correctly received/decoded. When the CRC is not passed, the corresponding transmission has not been correctly received/decoded.

A first scenario is exemplarily assumed where the base station transmits the min_K value update instruction in a DCI for scheduling a downlink transmission (may be termed DL-scheduling DCI). Correspondingly, the base station transmits the DL-scheduling DCI and correspondingly the scheduled PDSCH to the UE. The reception/decoding of the DCI may fail, in which case the UE will neither proceed to update the min_K value, nor receive the PDSCH from the BS and thus will not transmit the HARQ feedback to the BS regarding the not-received PDSCH.

Correspondingly, considering that the UE is not able to decode the min_K value update instruction, the BS should also not update the min_K value, despite having transmitted the corresponding instruction to the UE. Thus, without any kind of feedback from the UE to the BS, the BS should not update the min_K value. In this particular case, the BS scheduled the PDSCH transmission, for which the UE should have transmitted the HARQ feedback. When not receiving any HARQ feedback for the scheduled PDSCH transmission (e.g., at the appropriate HARQ feedback timing, e.g., as also instructed in the scheduling DCI), the BS will derive therefrom that the UE did not correctly decode the DCI and thus also not the min_K value update instruction.

On the other hand, assuming that the reception/decoding of the DCI does not fail, the UE will try to receive the PDSCH as scheduled by the received DCI and will proceed to determine whether and when to update the min_K value as instructed in the DL-scheduling DCI.

There can be different rules on how the UE and the BS may handle such a scenario with regard to the update of the min_K value.

For instance, the UE does not update the min_K value in case the DCI is correctly decoded but the PDSCH is not correctly received. Correspondingly, the base station when receiving a HARQ NACK as the feedback from the UE, also does not update the min_K value previously instructed to the UE.

Figure 22:
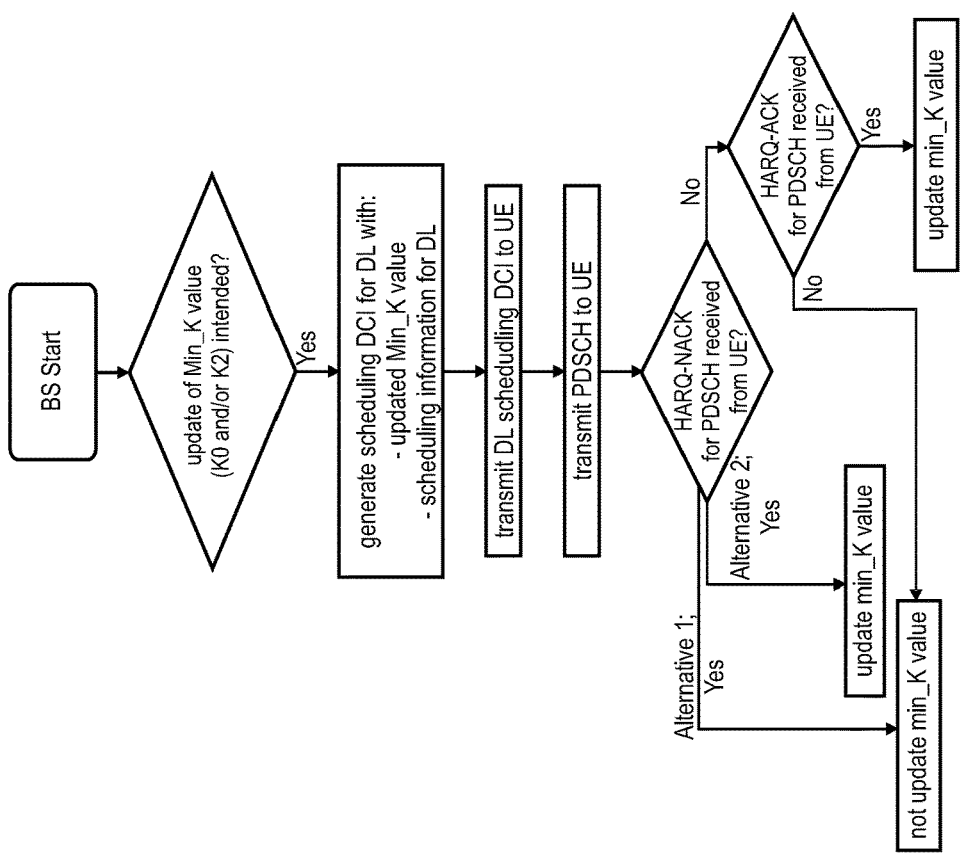
Figure 21:
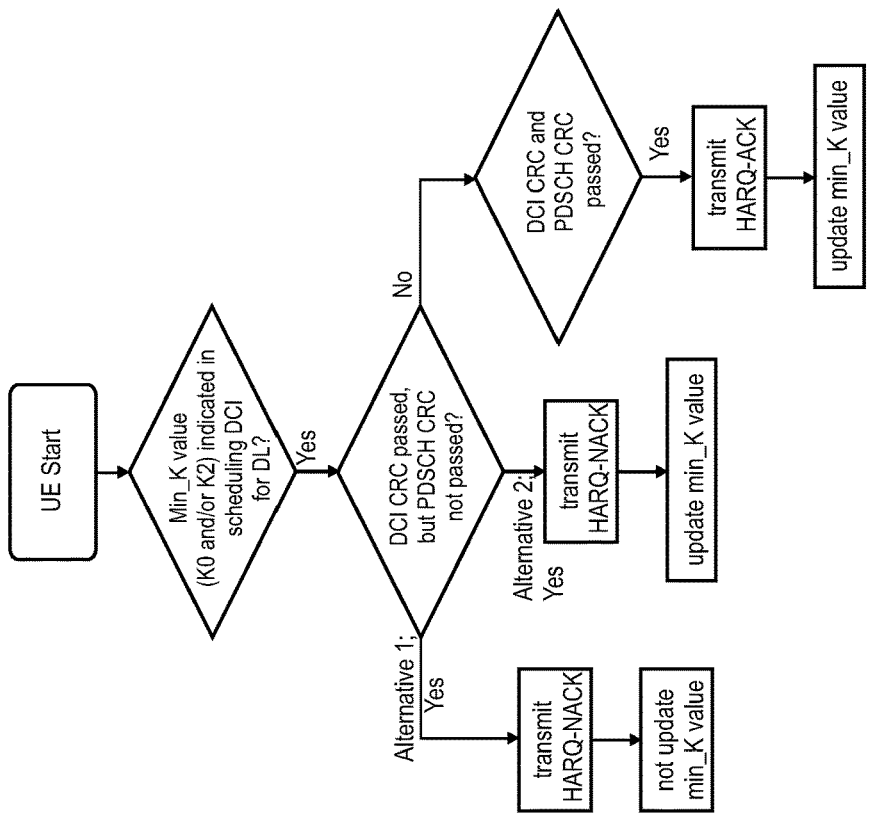

This UE behavior and BS behavior are exemplarily illustrated in FIG. 15 as well as FIG. 21 and FIG. 22. FIG. 15 illustrates a signaling exchange and processing sequence at the UE and the BS for the above-discussed scenario and applying the exemplary implementation of the solution. FIG. 21 is a sequence diagram for the UE behavior for the above-discussed scenario and implementing one exemplary solution as discussed above. FIG. 22 is a sequence diagram for the base station behavior for the above-discussed scenario and implementing one exemplary solution as discussed above. Correspondingly, as apparent from these figures (in FIG. 21, see "Alternative 1; Yes" path when determining whether the DCI CRC passed but PDSCH CRC not passed; in FIG. 22, see "Alternative 1; Yes" path when determining whether the HARQ-NACK for the PDSCH is received from the UE or not), the failed decoding of the PDSCH at the UE side leads the UE to not update the min_K value. Correspondingly, the base station, when receiving the negative acknowledgment of the HARQ process (NACK) does not update the min_K value either. Thus, both the UE and the BS still use the old min_K value and are as a result aligned in said respect with one another.

According to an alternative solution, even though the PDSCH could not be correctly received by the UE, the min_K value is updated at the UE according to the instruction in the received DCI, after transmitting the HARQ NACK feedback to the BS. The BS in turn will update the min_K value as instructed previously to the UE, after receiving from the UE the HARQ-NACK for the previously scheduled PDSCH. The HARQ NACK is taken as sufficient feedback from the UE that the DCI, scheduling the PDSCH, was correctly received, and thus that the min_K value update instruction in that same DCI was correctly received and processed as well in the UE. The HARQ NACK regarding the PDSCH transmission could only have been transmitted, when having properly decoded the DCI and the PDSCH-related scheduling information therein.

This UE behavior and BS behavior is exemplarily illustrated in FIG. 16 as well as FIGS. 21 and 22. FIG. 16 illustrates a signaling exchange and processing sequence at the UE and the BS for the above-discussed scenario and applying the exemplary implementation of the solution. Correspondingly, as apparent from these figures (in FIG. 21, see "Alternative 2; Yes" path when determining whether the DCI CRC passed but PDSCH CRC not passed; in FIG. 22, see "Alternative 2; Yes" path when determining whether the HARQ-NACK for the PDSCH is received from the UE or not), the failed decoding of the PDSCH at the UE side leads the UE and the BS to update the min_K value (in contrast to the alternative solution discussed above in connection with FIG. 15).

FIG. 17 illustrates a signaling exchange and processing sequence at the UE and the base station for a scenario in which both the DCI and the PDSCH, scheduled by the DCI, are decoded successfully. In correspondence with the solution explained above in connection with FIG. 16, the HARQ feedback (in this scenario the positive HARQ-ACK), is taken as sufficient feedback from the UE that the DCI, scheduling the PDSCH, was correctly received and thus that the min_K value update instruction in that same DCI was correctly received and processed as well in the UE. The UE behavior thus involves performing the update of the min_K value, as instructed in the DCI, after transmitting the HARQ ACK feedback. The BS behavior thus involves performing the update of the min_K value, as instructed in the DCI, after receiving the HARQ ACK feedback. This UE and BS behavior is also apparent from FIGS. 21 and 22 respectively. FIG. 21 illustrates how the UE updates the min_K value after transmitting the HARQ ACK (i.e., when DCI CRC and PDSCH CRC are both passed). FIG. 22 illustrates how the BS, after receiving the HARQ ACK from the UE for the previously transmitted PDSCH, updates the min_K value.

The above discussed exemplary solutions illustrated in FIGS. 15, 16, 21 and 22 make use of the HARQ feedback associated with the PDSCH, scheduled with the same DCI that carries the min_K value update instruction. By performing the min_K value update at both sides after the HARQ feedback, ambiguity and misalignment during the time between reception of the scheduling DCI with the min_K value update instruction and the HARQ feedback exchange can be avoided, specifically avoiding disadvantages should the base station schedule the UE again in that time interval.

According to another alternative solution, the HARQ ACK feedback is not considered reliable enough to trigger performing the update of the min_K value at both sides. For instance, the base station might not correctly receive the HARQ feedback, which might cause problems because the UE would update the min_K value (see, e.g., FIG. 21, update min_K value after transmitting HARQ-ACK) while the base station would not update the min_K value (see, e.g., FIG. 22, not updating min_K value when HARQ-ACK for previous PDSCH is not received from UE). In order to avoid such problems, the update of the min_K value is made dependent on the correct reception of the HARQ feedback. For instance, the UE should not update the min_K value after transmitting the HARQ-ACK, but at a later time after receiving a corresponding feedback from the BS that the HARQ-ACK (transmitted by the UE for the PDSCH scheduled by the DCI carrying the min_K value update instruction) was correctly received by the base station. For instance, a corresponding message from the BS to the UE can be used to synchronize the min_K update, this message allowing the UE to derive that the HARQ-ACK (transmitted by the UE for the PDSCH scheduled by the DCI carrying the min_K value update instruction) was correctly received by the base station. Correspondingly, the UE updates the min_K value after receiving such a message from the BS, and the BS updates the min_K value after transmitting such as message to the UE.

According to one exemplary implementation, when the BS correctly receives the positive HARQ ACK from the UE, the BS can transmit new data instead of retransmitting the old (in case negative HARQ NACK is received from UE). This may involve that the BS flushes the corresponding HARQ buffer of the HARQ process that handled the old data of the (successfully received) PDSCH transmission and transmits new data using that same HARQ process. The BS would schedule a new PDSCH transmission, using another scheduling DCI, indicating that the new data is transmitted (e.g., by toggling the new data indicator) and indicating the use of the HARQ process (the same HARQ process as used for the previous data transmission). The UE is thus able to derive from such a DCI that the HARQ-ACK, regarding the correctly decoded PDSCH, was correctly received at the BS.

Therefore, in order to synchronize the min_K value update between the UE and the BS, the update is made dependent on this new DL-scheduling DCI with the toggled new-data indicator and with the same HARQ process ID as used for the previous PDSCH transmission, and correspondingly indicated in the previous DL-scheduling DCI carrying the min_K value update instruction.

Figure 24:
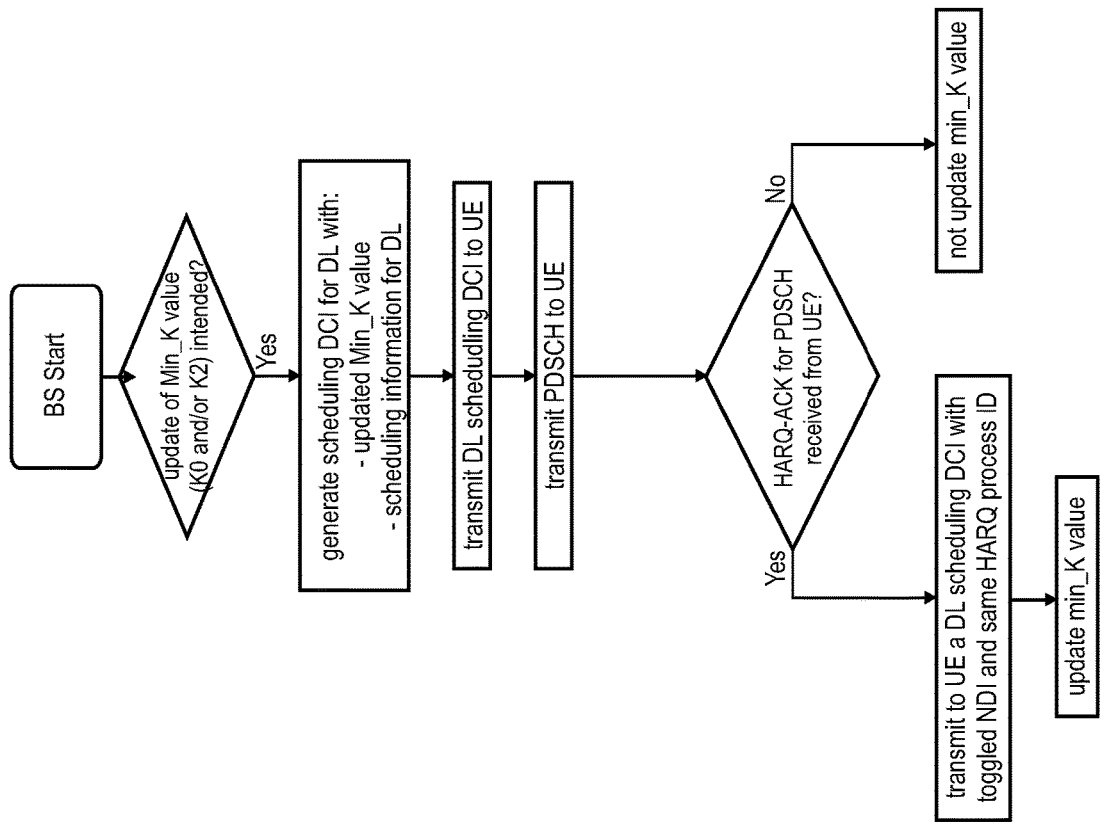
Figure 23:
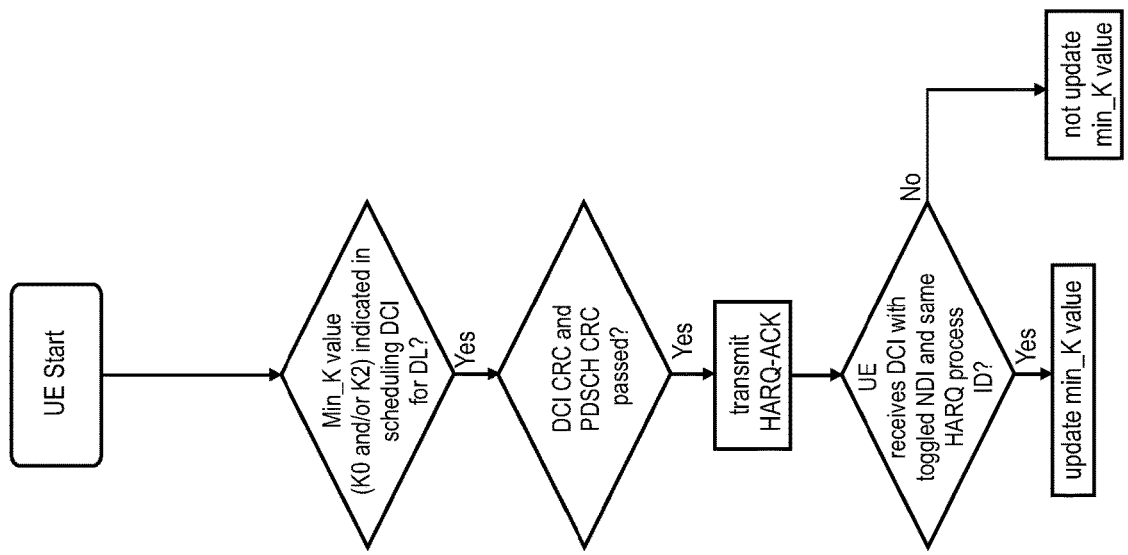

This solution is illustrated in FIG. 18 and FIGS. 23 and 24. FIG. 18 illustrates a signaling exchange and processing sequence at the UE and the base station for such a solution and discloses how the update of the min_K value is linked to the second DL-scheduling DCI with the toggled new data indicator (NDI, meaning DCI schedules new data in DL, not a retransmission of previous data) and with the HARQ process ID 1 that is the same HARQ process ID as used for the first DL-scheduling DCI (see first message in FIG. 18). According to the exemplary UE sequence diagram of FIG. 23 the UE updates the min_K value after receiving the DCI with the toggled NDI and the same HARQ process ID as before. Correspondingly, as apparent from the exemplary BS sequence diagram of FIG. 24, the BS updates the min_K value after transmitting, to the UE, such a DCI with the toggled NDI and the same HARQ process ID as before.

In the above scenarios, it was assumed that the min_K value update instruction was carried from the BS to the UE in a DL-scheduling DCI. In the following scenarios, it is assumed that the min_K value update instruction is carried from the BS to the UE in a DCI that schedules an uplink transmission to be performed by the UE (an UL-scheduling DCI). Differently from the previous scenarios that were based on a DL-scheduling DCI, when using an UL-scheduling DCI to carry the min_k value update, no HARQ feedback is available between the UE and the BS. However, the scheduled uplink transmission can be used as the inter-entity feedback communication to be employed to synchronize the UE and BS updating times for the min_K value update.

As similarly the case for the DL-scheduling DCI scenarios, when the UE is not able to decode the min_K value instruction from the UL-scheduling DCI, the UE is not able to update the min_K value, and the BS should also not update the min_K value. The BS is aware that the UE should transmit an uplink transmission as scheduled. Correspondingly, one exemplary solution links the update time of the min_K value to the PUSCH transmission. For instance, the UE may update the min_K value, as instructed by the UL-scheduling DCI, after performing the corresponding PUSCH transmission to the BS, as scheduled by the DCI. The BS will update the min_K value, as instructed in the UL-scheduling DCI, after receiving the PUSCH transmission from the UE.

Figure 26:
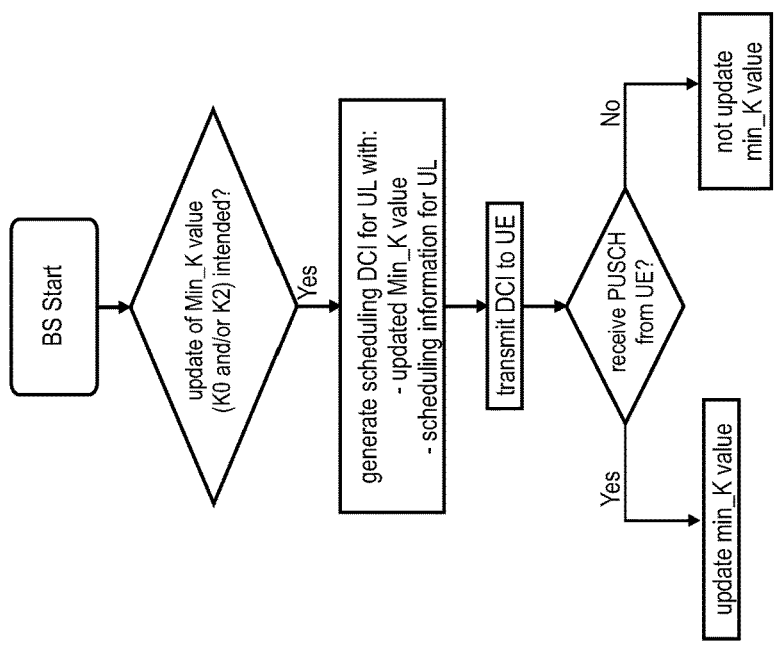
Figure 25:
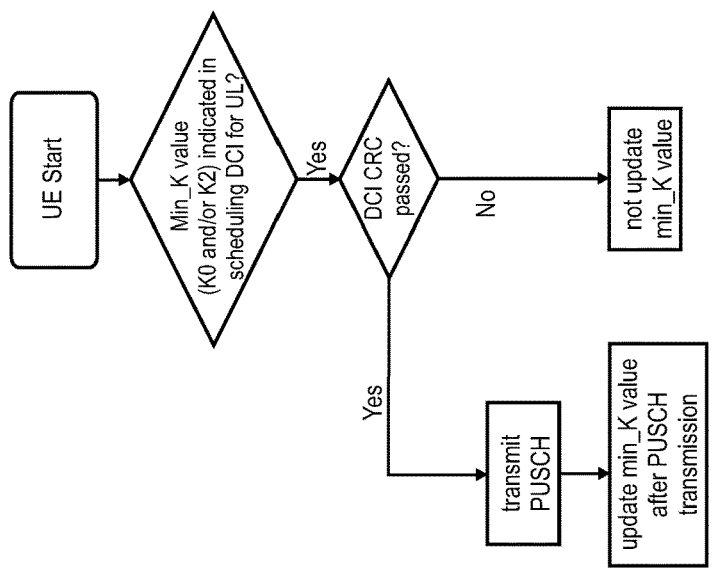

This solution is illustrated in FIGS. 19, 25, and 26. FIG. 19 illustrates a signaling exchange and processing sequence at the UE and the base station for such a solution and illustrates how the update of the min_K value is processed after transmitting by the UE respectively receiving by the BS the PUSCH. This is equally apparent from FIGS. 25 and 26, illustrating sequence diagrams for the UE respectively BS behavior. As apparent therefrom, the UE, after successfully receiving the UL-scheduling DCI, transmits the scheduled PUSCH and updates the min_K value as instructed after the PUSCH transmission. If the DCI is not successfully received, the UE is not even aware of the min_K value update instruction and thus does not update the min_K value. The base station behavior involves generating and transmitting to the UE the UL-scheduling DCI with the UL scheduling information and the updated min_K value. The BS then monitors for the PUSCH, and if the PUSCH is received from the UE, the update of the min_K value as instructed before is performed. On the other hand, if the PUSCH is not received from the UE, the update of the min_K value is not performed.

The above-discussed exemplary solution makes use of the PUSCH transmission, scheduled with the same DCI that carries the min_K value update instruction. Thus, ambiguity and misalignment during the time between reception of the UL-scheduling DCI with the min_K value update instruction and the PUSCH transmission can be avoided, specifically avoiding disadvantages should the base station schedule the UE again in that time interval.

According to an alternative solution, the PUSCH transmission is not considered reliable enough to trigger performing the update of the min_K value. For instance, the base station might not correctly receive the PUSCH transmission, which might cause problems should the UE update the min_K value (see, e.g., FIG. 25, update min_K value after PUSCH transmission), while the base station does not update the min_K value (see, e.g., FIG. 26, not update min_K value if PUSCH is not received from UE). In order to avoid such problem, the update of the min_K value is made dependent on the correct reception of the PUSCH transmission. For instance, the UE should not update the min_K value after transmission of the PUSCH transmission, but at a later time after receiving a corresponding feedback from the BS that the PUSCH transmission (transmitted by the UE as scheduled by the DCI carrying the min_K value update instruction) was correctly received by the base station. For instance, a corresponding message from the BS to the UE can be used to synchronize the min_K update, this message allowing the UE to derive that the PUSCH transmission (transmitted by the UE as scheduled by the DCI carrying the min_K value update instruction) was correctly received by the base station. Correspondingly, the UE updates the min_K value after receiving such a message from the BS, and the BS updates the min_K value after transmitting such as message to the UE.

According to one exemplary implementation, when the BS correctly receives the PUSCH transmission from the UE, the BS can schedule the UE to transmit new data instead of retransmitting the old data. The BS would schedule a new PUSCH transmission, by transmitting another UL-scheduling DCI, indicating that new data is to be transmitted by the UE (e.g., by toggling the new data indicator, NDI) and indicating the use of the same HARQ process as before (the same HARQ process as used by the UE for the previous PUSCH transmission and as indicated in the previous UL-scheduling DCI). Thus, the UE is able derive from such a DCI that the PUSCH transmission was correctly received at the BS.

Therefore, in order to synchronize the min_K value update between the UE and the BS, the update is made dependent on this new UL-scheduling DCI with the toggled new-data indicator and with the same HARQ process ID as used for the previous PUSCH transmission, scheduled by the DCI carrying the min_K update instruction.

Figure 28:
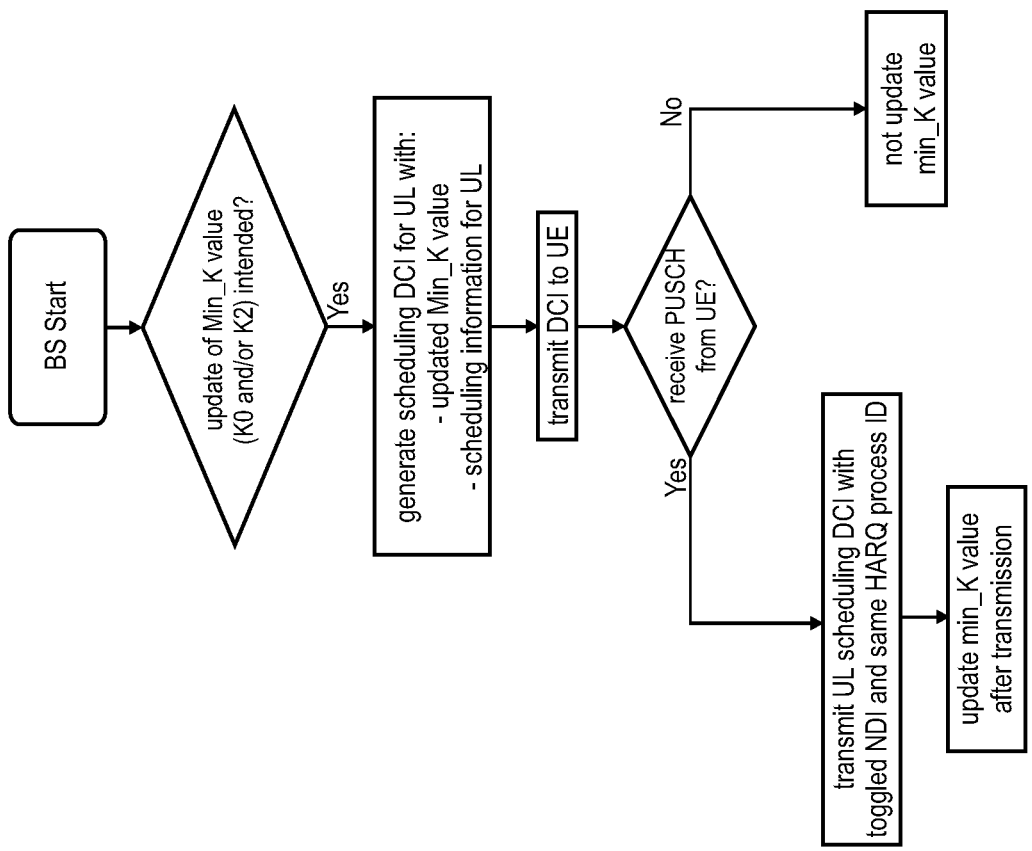
Figure 27:
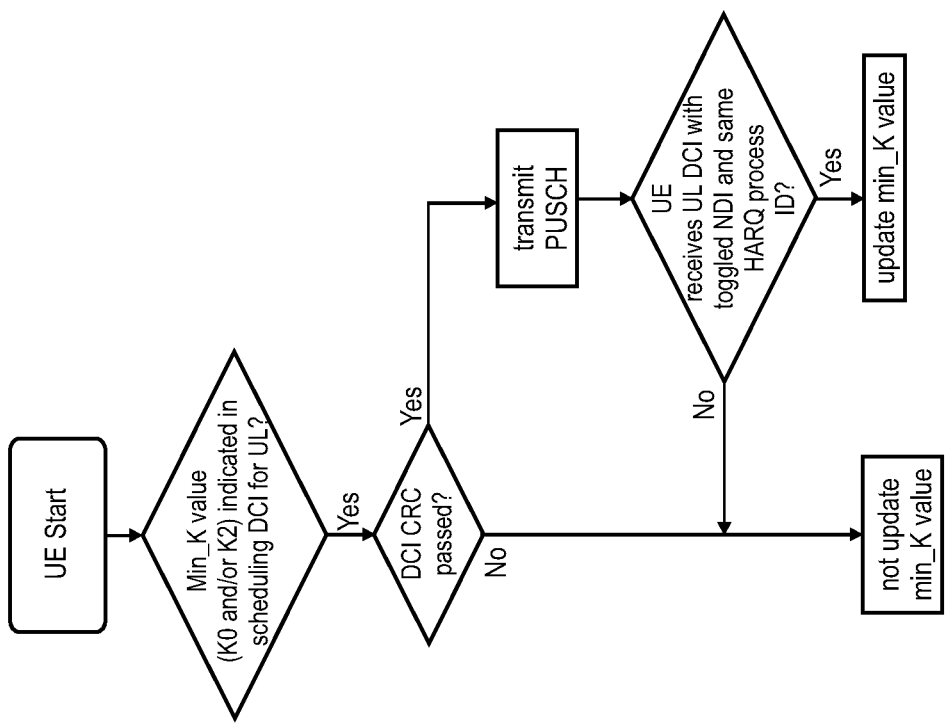

This solution is illustrated in FIG. 20 and FIGS. 27 and 28. FIG. 20 illustrates a signaling exchange and processing sequence at the UE and the base station for such a solution and discloses how the update of the min_K value is linked to the second DL-scheduling DCI with the toggled new data indicator (NDI, meaning DCI schedules new data in the uplink, not a retransmission of previous data) and with the HARQ process ID 1 which is the same HARQ process ID, as used for the first UL-scheduling DCI (see first message in FIG. 20). According to the exemplary UE sequence diagram of FIG. 27, the UE updates the min_K value after receiving the second UL-scheduling DCI with the toggled NDI and the same HARQ process ID as before. Correspondingly, as apparent from the exemplary BS sequence diagram of FIG. 28, the BS updates the min_K value after transmitting, to the UE, such a second UL-scheduling DCI with the toggled NDI and the same HARQ process ID as before.

In the previous exemplary scenarios, it was assumed that the DCI carrying the min_k value instructions is a scheduling DCI, e.g., scheduling a downlink or uplink transmission. However, the inventors have identified that it may also be beneficial to provide solutions that can be applied in scenarios where non-scheduling DCIs carry the min_K value update instruction and where there is no HARQ or PUSCH transmission as the inter-entity feedback communication. For instance, such a non-scheduling DCI can be a group-common DCI, such as the DCI Format 2-2 that can be used by the base station to transmit TPC commands for PUCCH and PUSCH.

In order to implement a feedback mechanism that does not rely on the scheduling DCI, the gNB can use a suitable UL transmission trigger in the non-scheduling DCI. The trigger may, e.g., cause the UE to transmit an UL reference signal (RS), such as the sounding reference signal (SRS), to the BS or to cause the UE to transmit an UL report, such as the channel state information report, to the BS. The uplink communication (e.g., the RS or report) triggered by the RS trigger and/or the report trigger in the DCI that also carries the min_K value update instruction, can be used by the BS to confirm that the UE indeed was able to correctly receive the DCI, including the trigger and the min_K value update.

Figure 30:
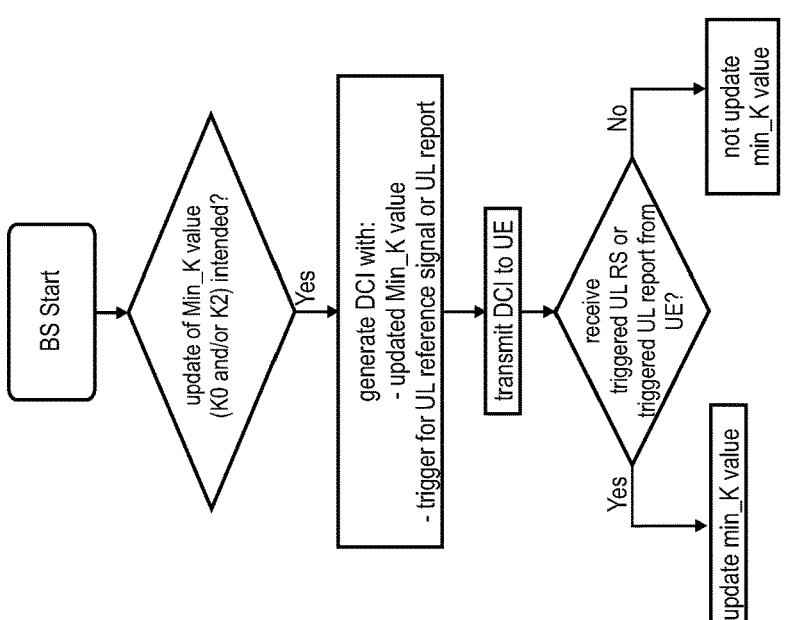
Figure 29:
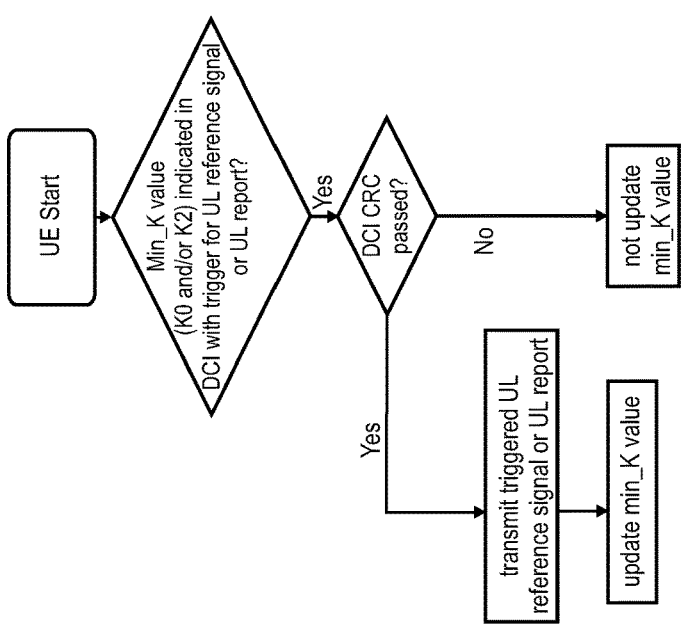

Exemplary implementations of such solutions will be described in connection with FIG. 29-32. FIGS. 29 and 30 respectively illustrate sequence diagrams for the UE and BS behavior, covering that the DCI either comprises the reference signal trigger or the report trigger. In any case, assuming that the DCI is correctly received (DCI CRC is passed), the UE will react to the trigger by transmitting the triggered uplink transmission, be it the reference signal or the report. After the transmission of the RS or the report, the UE may proceed to update the min_K value. When the UE is not able to correctly decode the DCI, it will not be aware of the trigger nor of the min_K value update, such that neither the uplink transmission will be performed nor the update of the min_K value. Correspondingly, as apparent from FIG. 30, the BS, when it wants to update the min_K value, will generate and transmit to the UE the particular DCI, including the min_K value to be updated and the trigger for the reference signal or the report. Before updating the min_K value, the BS will monitor for the reception of the triggered reference signal or the triggered report, and in case it is received, the base station proceeds to update the min_K value. On the other hand, should the base station not receive the triggered reference signal or the triggered report, no update of the min_K value will be performed by the base station.

Figure 32:
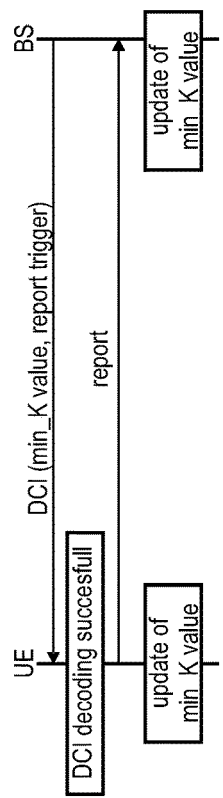
FIGS. 31 and 32 illustrate signaling exchanges and processing sequences at the UE and the BS for different implementations of the improved time-domain scheduling procedure, in line with FIGS. 29 and 30, FIGS. 33 and 34 respectively illustrate flow diagrams for an exemplary UE behavior respectively BS behavior according to an implementation of the improved time-domain scheduling procedure.
Figure 31:
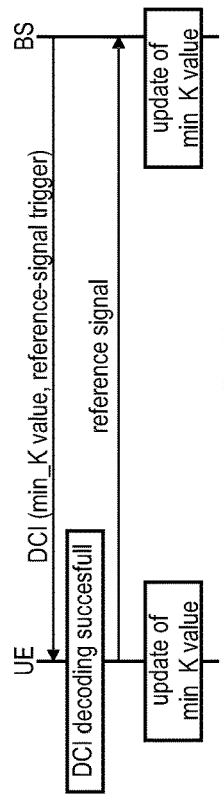

FIGS. 31 and 32 illustrate signaling exchange and processing sequence at the UE and the base station respectively for the case of triggering a reference signal and triggering a report at the UE. As also apparent therefrom, the update of the min_K value is executed at the UE after the transmission of the triggered reference signal or triggered report, while being executed conversely at the base station after the reception of the triggered reference signal or triggered report.

In the solutions explained in connection with FIG. 29-32, the trigger and the min_K value update instruction are transmitted together in the same DCI. The trigger and the min_K value update instruction can be transmitted separately in the same DCI. According to further improvements to the solutions, the trigger and the min_K value are jointly encoded so as to save bits in the DCI.

In the following tables, an exemplary joint encoding of the min_K values with the one respective trigger is presented. For instance, the following 2-bit indexes jointly encode a min_K value (here, e.g., the min_K0 value) and an aperiodic CSI trigger and the respective resources to be used by the UE to transmits the A-CSI report.

| Index | K0_min | A-CSI resource |
|---|---|---|
| 00 | 0 | Resource #1 |
| 01 | 1 | Resource #2 |
| 10 | 2 | Resource #3 |
| 11 | 3 | Resource #4 |

For instance, when transmitting the index 01, the BS instructs the UE to update to a min_K value of 1 and includes an A-CSI trigger (UE shall use resource #2 for the A-CSI report transmission).

As another example, the following table illustrates 2-bit indexes that jointly encode a min_K value (here, e.g., the min_K2 value) and an SRS trigger and the respective resources to be used by the UE to transmit the SRS.

| Index | K2_min | SRS resource |
|---|---|---|
| 00 | 0 | Resource #1 |
| 01 | 1 | Resource #2 |
| 10 | 2 | Resource #3 |
| 11 | 3 | Resource #4 |

For instance, when transmitting the index 11, the BS instructs the UE to update to a min_K value of 3 and includes an SRS trigger (UE shall use resource #4 for the SRS transmission).

The above-discussed solutions of FIG. 15-32 involve that the update of the min_K value is performed after an event, e.g., a message is received or transmitted, such as receiving respectively transmitting the HARQ ACK/NACK or PUSCH or the reference signal or the report. In these solutions "after" should be understood as being in close relation with the corresponding event, not as being an independent time after the event. Thus, the "when," could also be used instead of "after," e.g., perform update when transmitting the HARQ NACK/ACK). For instance, "after" can be, e.g., understood as meaning immediately after the event. Alternatively, "after" may also encompass a brief delay after the event so as to account, e.g., for a transmission and/or processing delay at the other side, so as to achieve a better time synchronization between the two entities involved in the synchronized min_K value update.

In the above described solutions, the UE when not being able to correctly decode the DCI, carrying the min_K value update instruction, does not update the currently-configured min_K value. The following solutions handle this case differently, as will become apparent from below.

As has been explained before, the min_K value update instruction can be carried by a DCI of the Power Saving Signal (PoSS). The PoSS is transmitted at instances known to the UE, e.g., shortly before the DRX On-Duration starts. The UE wakes up to monitor for the PoSS, and would be thus aware if it misses the PoSS and thus possibly misses a min_K value update.

Exemplary implementations of these solutions will be explained in connection with FIG. 33-35. FIG. 33 is a sequence diagram for the UE behavior, FIG. 34 is a sequence diagram for the BS behavior.

According to this solution, default min_K values (K0 and K2 values) are configured at the UE to be used in such a case. For instance, the UE can be configured beforehand with such default min_K values, e.g., by the base station using RRC signaling.

The UE may then use these previously-configured default min_K values in case it determines that it has missed the power saving signal (e.g., CRC of power saving signal not passed).

Since the UE does not know what the missed PoSS contained (be it the min_K0 and/or the min_K2 value), the UE, e.g., uses the default values for both min_K0 and min_K2 parameters.

The base station on the other hand needs to rely on whether or not it receives a feedback from the UE regarding the power saving signal that allows the BS to derive that the PoSS was correctly received by the UE or not. If such feedback is not received, the gNB determines that the UE did not properly decode the DCI and thus also updates the min_K0 and min_K2 parameters to previously-configured default values.

Such feedback could be of different types. For instance, the PoSS could be a DL-scheduling DCI in which case the feedback could be the HARQ ACK or NACK, as explained in the previous solutions, such as the ones in connection with FIG. 15-17. Alternatively, the PoSS could be an UL-scheduling DCI, in which case the feedback could be the scheduled PUSCH, as explained in the previous solutions in connection with FIG. 19. Alternatively, the PoSS could be a DCI, carrying a trigger for an UL reference signal (e.g., SRS) or an UL report (A-CSI report), in which case the feedback could be the triggered UL reference signal or the triggered UL report, as explained in the previous solutions in connection with FIG. 29-32.

FIG. 35 illustrates the signaling exchange and processing sequence at the BS and the UE for an exemplary implementation of the present solutions where the PoSS triggers a reference signal. As apparent therefrom, because decoding of the PoSS failed at the UE, no reference signal is triggered and sent by the UE (illustrated in dashed line and being crossed out). Due to the missed reference signal, the BS derives that the PoSS decoding failed at the UE and also uses the default min_K values.

There are two possibilities on how the UE continues after determining it missed the PoSS. In the first alternative, the UE does not wake up and thus does not further monitor the PDCCH. In the second alternative, the UE wakes up and monitors the PDCCH for, e.g., DCIs.

Apart from using a previously-configured default value for the min_K values, the UE may also use default values for other parameters, such as one or more of the following:
Frequency bandwidth part,
Scell,
Maximum MIMO layer number,
Antenna panel,
CSI offset value
PDCCH skipping time-domain information. In particular, the frequency bandwidth part determines a maximum bandwidth part range that the base station may apply to schedule the UE in the future Moreover, the default value of the SCell could stand for the maximum frequency resource range to schedule the UE by the base station.

Further, the maximum MIMO layer number could be the upper bound of the spatial multiplexing layer number that the base station will schedule the UE with.

The default antenna panel value could be the antenna panel that the gNB will require the UE to utilize no matter what the further indication is.

In addition, the CSI offset value is used by the UE as assumed minimum time domain offset used by the CSI report.

Finally, providing a default value for the PDCCH skipping time-domain information allows UE to skip PDCCH monitoring as per the default value in case it miss-detects the power saving signal.

Moreover, the default values of the various parameters, e.g., the min_K value, can also be checked when determining the min_K value to be updated in the future. For instance, the min_K value should not be shorter than the configured default value, in order to avoid cases where the UE uses the default min_K value while a lower K value is actually used for scheduling.

Similarly, the maximum MIMO layer value should not be larger than the configured default value, because UE has only activated some of the hardware and processing capability, e.g., receiving chain to satisfy the maximum MIMO layer value to save power thus a larger value cannot be used by the UE immediately.

Moreover, the indicated BWP should not be out of range of the configured default parameter value, so as the UE has only activated some of the hardware and processing capability, to satisfy the BWP value to save power thus a larger value cannot be used by the UE immediately.

Further Aspects

According to a first aspect, a user equipment, UE, comprising a receiver, which receives, from a base station, a minimum cross-slot time-domain scheduling parameter, indicating a minimum amount of slots between a scheduling downlink control information, DCI, and an uplink or downlink transmission scheduled by the scheduling DCI. The minimum cross-slot time domain scheduling parameter is carried by a DCI message. Processing circuitry of the UE determines an updating time at which a previously-received minimum cross-slot time-domain scheduling parameter is to be updated based on the received minimum cross-slot time-domain scheduling parameter and then updates the previously-received minimum cross-slot time-domain scheduling parameter based on the received minimum cross-slot time-domain scheduling parameter at the determined updating time. The updating time is determined based on a message exchanged between the UE and the base station, wherein the message relates to the DCI message carrying the minimum cross-slot time-domain scheduling parameter.

According to a second aspect provided in addition to the first aspect,
 1) in case the minimum cross-slot time-domain scheduling parameter is received in a scheduling DCI message, that schedules a downlink, DL, transmission,
 2) in case the scheduled downlink transmission is not correctly decoded,
  3) the updating of the previously-received minimum cross-slate time-domain scheduling parameter is not performed by the processing circuitry, or
  3) the updating time is determined to be after transmission of a negative feedback of a retransmissions protocol to the base station regarding the not correctly decoded downlink transmission.

According to a third aspect provided in addition to the first or second aspect,
 1) in case the minimum cross-slot time-domain scheduling parameter is received in a scheduling DCI message, that schedules a downlink, DL, transmission,
 2) in case the scheduled downlink transmission is correctly decoded,
  3) the updating time is determined to be after transmission of a positive feedback of a retransmission protocol to the base station regarding the correctly decoded downlink transmission, or
  3) the updating time is determined to be after receiving, from the base station, a second scheduling DCI message, indicating that a positive feedback of a retransmission protocol, transmitted by the UE to the base station regarding the correctly decoded downlink transmission, was correctly received by the base station, or
  3) the updating time is determined to be after receiving, from the base station, a second scheduling DCI message, indicating that a second downlink transmission, scheduled by the second scheduling DCI message, refers to new data and to a retransmission protocol process that is the same as the one handling the correctly decoded downlink transmission.

According to a fourth aspect provided in addition to one of the first to third aspects, 1) in case the minimum cross-slot time-domain scheduling parameter is received in a scheduling DCI message, that schedules an uplink, UL, transmission,
    2) the updating time is determined to be after performing the uplink transmission scheduled by the UL-scheduling DCI message, or
    2) the updating time is determined to be after receiving, from the base station, a second scheduling DCI message, indicating that the uplink transmission, transmitted by the UE to the base station as scheduled by the UL-scheduling DCI message, was correctly received by the base station, or
    2) the updating time is determined to be after receiving, from the base station, a second scheduling DCI message, indicating that a second uplink transmission, scheduled by the second scheduling DCI message, refers to new data and to a retransmission protocol process that is the same as the one handling the uplink transmission.

According to a fifth aspect, provided in addition to one of the first to fourth aspects,
1) in case the minimum cross-slot time-domain scheduling parameter is not received in a scheduling DCI message, that schedules an uplink or downlink transmission, but in a DCI message that includes a trigger for an aperiodic report or reference signal to be transmitted in the uplink from the UE to the base station,
2) the updating time is determined to be after transmitting the triggered aperiodic report or reference signal in the uplink to the base station.

According to a sixth aspect, provided in addition to the fifth aspect, the minimum cross-slot time-domain scheduling parameter and the trigger are jointly encoded into a parameter of the received DCI message, wherein the processing circuitry, when in operation, jointly decodes, from the parameter, the minimum cross-slot time-domain scheduling parameter and the trigger. In an optional implementation, the aperiodic repot is an aperiodic channel state information report, and the reference signal is a sounding reference signal.

According to a seventh aspect provided in addition to any of the first to sixth aspects,
1) in case the DCI message, carrying the minimum cross-slot time-domain scheduling parameter is not correctly decoded,
2) updating the previously-received minimum cross-slot time-domain scheduling parameter based on a default minimum cross-slot time-domain scheduling parameter, and optionally
2) wherein the UE uses a default or upper bound value for one or more of a frequency bandwidth part, a maximum Multiple Input, Multiple Output, MIMO, a layer number, antenna panel, or downlink control channel monitoring skipping time.

The default minimum cross-slot time-domain scheduling parameter is configured by the base station, optionally using a message of the Radio Resource Control protocol.

According to an eighth aspect provided in addition to one of the first to seventh aspects, the minimum cross-slot time-domain scheduling parameter refers either to a minimum downlink cross-slot time-domain scheduling parameter or to a minimum uplink cross-slot time-domain scheduling parameter. In an optional implementation, the DCI message carrying the minimum cross-slot time-domain scheduling parameter is a power saving signal.

According to a ninth aspect, a base station is provided comprising a transmitter, which transmits, to a user equipment, UE, a minimum cross-slot time-domain scheduling parameter, indicating a minimum amount of slots between a scheduling downlink control information, DCI, and an uplink or downlink transmission scheduled by the scheduling DCI, the minimum cross-slot time domain scheduling parameter being carried by a DCI message. Processing circuitry of the base station determines an updating time at which a previously-used minimum cross-slot time-domain scheduling parameter is to be updated based on the transmitted minimum cross-slot time-domain scheduling parameter. The processing circuitry updates the previously-used minimum cross-slot time-domain scheduling parameter based on the transmitted minimum cross-slot time-domain scheduling parameter at the determined updating time. The updating time is determined based on a message exchanged between the UE and the base station, wherein the message relates to the DCI message carrying the minimum cross-slot time-domain scheduling parameter to be updated.

According to a tenth aspect, provided in addition to the ninth aspect,
1) in case the minimum cross-slot time-domain scheduling parameter is transmitted in a scheduling DCI message, that schedules a downlink, DL, transmission,
2) in case a negative feedback of a retransmission protocol is received from the base station regarding the not correctly decoded downlink transmission,
3) the updating of the previously-received minimum cross-slate time-domain scheduling parameter is not performed by the processing circuitry, or
3) the updating time is determined to be after reception of the negative feedback of the retransmissions protocol.

According to an eleventh aspect, provided in addition to the ninth or tenth aspect,
1) in case the minimum cross-slot time-domain scheduling parameter is transmitted in a scheduling DCI message, that schedules a downlink transmission,
2) in case a positive feedback of a retransmission protocol is received regarding the not correctly decoded downlink transmission,
3) the updating time is determined to be after reception of the positive feedback of the retransmission protocol, or
3) the updating time is determined to be after transmitting, from the base station, a second scheduling DCI message to the UE, indicating that a positive feedback of a retransmission protocol, transmitted by the UE to the base station regarding the correctly decoded downlink transmission, was correctly received by the base station, or
3) the updating time is determined to be after transmitting, from the base station, a second scheduling DCI message to the UE, indicating that a second downlink transmission, scheduled by the second scheduling DCI message, refers to new data and to a retransmission protocol process that is the same as the one handling the transmitted downlink transmission.

According to a twelfth aspect, provided in addition to any of the ninth to eleventh aspects,
1) in case the minimum cross-slot time-domain scheduling parameter is transmitted in a scheduling DCI message, that schedules an uplink transmission,
2) the updating time is determined to be after receiving the uplink transmission scheduled by the UL-scheduling DCI message from the UE, or 2) the updating time is determined to be after transmitting, from the base station to the UE, a second scheduling DCI message, indicating that the uplink transmission, transmitted by the UE to the base station as scheduled by the UL-scheduling DCI message, was correctly received by the base station, or 2) the updating time is determined to be after transmitting, from the base station to the UE, a second scheduling DCI message, indicating that a second uplink transmission, scheduled by the second scheduling DCI message, refers to new data and to a retransmission protocol process that is the same as the one handling the uplink transmission.

According to a thirteenth aspect, provided in addition to the any of the ninth to twelfth aspects, 1) in case the minimum cross-slot time-domain scheduling parameter is not transmitted in a scheduling DCI message, that schedules an uplink or downlink transmission, but in a DCI message that includes a trigger for an aperiodic report or reference signal to be transmitted in the uplink from the UE to the base station, 2) the updating time is determined to be after receiving the triggered aperiodic report or reference signal in the uplink from the UE.

According to a fourteenth aspect, provided in addition to any of the ninth to thirteenth aspects, 1) in case no feedback is received regarding the DCI message, carrying the minimum cross-slot time-domain scheduling parameter, 2) updating the previously-used minimum cross-slot time-domain scheduling parameter based on a default minimum cross-slot time-domain scheduling parameter, and optionally 2) wherein the base station uses a default or upper bound value for one or more of a frequency bandwidth part, a maximum Multiple Input, Multiple Output, MIMO, a layer number, antenna panel, or downlink control channel monitoring skipping time.

The default minimum cross-slot time-domain scheduling parameter is configured by the base station at the UE, optionally using a message of the Radio Resource Control protocol.

According to a fifteenth aspect, a method is provided comprising the following steps performed by a user equipment:

receiving, from a base station, a minimum cross-slot time-domain scheduling parameter, indicating a minimum amount of slots between a scheduling downlink control information, DCI, and an uplink or downlink transmission scheduled by the scheduling DCI, the minimum cross-slot time domain scheduling parameter being carried by a DCI message, determining an updating time at which a previously-received minimum cross-slot time-domain scheduling parameter is to be updated based on the received minimum cross-slot time-domain scheduling parameter, and updating the previously-received minimum cross-slot time-domain scheduling parameter based on the received minimum cross-slot time-domain scheduling parameter at the determined updating time.

The updating time is determined based on a message exchanged between the UE and the base station, wherein the message relates to the DCI message carrying the minimum cross-slot time-domain scheduling parameter to be updated.

Hardware and Software Implementation of the Present Disclosure

The present disclosure can be realized by software, hardware, or software in cooperation with hardware. Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC (integrated circuit), a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus.

Some non-limiting examples of such a communication apparatus include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT).

The communication may include exchanging data through, for example, a cellular system, a wireless LAN system, a satellite system, etc., and various combinations thereof.

The communication apparatus may comprise a device such as a controller or a sensor, which is coupled to a communication device performing a function of communication described in the present disclosure. For example, the communication apparatus may comprise a controller or a sensor that generates control signals or data signals, which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

Further, the various embodiments may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc. It should be further noted that the individual features of the different embodiments may individually or in arbitrary combination be subject matter to another embodiment.

It would be appreciated by a person skilled in the art that numerous variations and/or modifications may be made to the present disclosure as shown in the specific embodiments. The present embodiments are, therefore, to be considered in all respects to be illustrative and not restrictive.

The invention claimed is:

1. A user equipment (UE) comprising:
  a receiver, which in operation, receives, from a base station, a minimum cross-slot time-domain scheduling parameter, indicating a minimum amount of slots between a scheduling downlink control information (DCI) and an uplink or downlink transmission scheduled by the scheduling DCI, the minimum cross-slot time domain scheduling parameter being carried by a DCI message, and
  processing circuitry, which in operation, determines an updating time at which a previously-received minimum cross-slot time-domain scheduling parameter is to be updated based on the received minimum cross-slot time-domain scheduling parameter,
  wherein the processing circuitry, in operation, updates the previously-received minimum cross-slot time-domain scheduling parameter based on the received minimum cross-slot time-domain scheduling parameter at the determined updating time,
  wherein the updating time is determined based on a message exchanged between the UE and the base station, wherein the message relates to the DCI message carrying the minimum cross-slot time-domain scheduling parameter to be updated, and
  wherein,
  1) In case the DCI message, carrying the minimum cross-slot time-domain scheduling parameter is not correctly decoded,
    2) the previously-received minimum cross-slot time-domain scheduling parameter is updated based on a default minimum cross-slot time-domain scheduling parameter.

2. The user equipment according to claim 1, wherein
  1) In case the minimum cross-slot time-domain scheduling parameter is received in a scheduling DCI message, that schedules a downlink (DL) transmission,
    2) In case the scheduled downlink transmission is not correctly decoded,
      3) the updating of the previously-received minimum cross-slate time-domain scheduling parameter is not performed by the processing circuitry, or
      3) The updating time is determined to be after transmission of a negative feedback of a retransmissions protocol to the base station regarding the not correctly decoded downlink transmission.

3. The user equipment according to claim 1, wherein
  1) In case the minimum cross-slot time-domain scheduling parameter is received in a scheduling DCI message, that schedules a downlink (DL) transmission,
    2) In case the scheduled downlink transmission is correctly decoded,
      3) The updating time is determined to be after transmission of a positive feedback of a retransmission protocol to the base station regarding the correctly decoded downlink transmission, or
      3) The updating time is determined to be after receiving, from the base station, a second scheduling DCI message, indicating that a positive feedback of a retransmission protocol, transmitted by the UE to the base station regarding the correctly decoded downlink transmission, was correctly received by the base station, or
      3) the updating time is determined to be after receiving, from the base station, a second scheduling DCI message, indicating that a second downlink transmission, scheduled by the second scheduling DCI message, refers to new data and to a retransmission protocol process that is the same as the one handling the correctly decoded downlink transmission.

4. The UE according to claim 1, wherein
  1) In case the minimum cross-slot time-domain scheduling parameter is received in a scheduling DCI message, that schedules an uplink (UL) transmission,
    2) The updating time is determined to be after performing the uplink transmission scheduled by the UL-scheduling DCI message, or
    2) The updating time is determined to be after receiving, from the base station, a second scheduling DCI message, indicating that the uplink transmission, transmitted by the UE to the base station as scheduled by the UL-scheduling DCI message, was correctly received by the base station, or
    2) The updating time is determined to be after receiving, from the base station, a second scheduling DCI message, indicating that a second uplink transmission, scheduled by the second scheduling DCI message, refers to new data and to a retransmission protocol process that is the same as the one handling the uplink transmission.

5. The UE according to claim 1, wherein
  1) In case the minimum cross-slot time-domain scheduling parameter is not received in a scheduling DCI message, that schedules an uplink or downlink transmission, but in a DCI message that includes a trigger for an aperiodic report or reference signal to be transmitted in the uplink from the UE to the base station,
    2) The updating time is determined to be after transmitting the triggered aperiodic report or reference signal in the uplink to the base station.

6. The UE according to claim 5, wherein the minimum cross-slot time-domain scheduling parameter and the trigger are jointly encoded into a parameter of the received DCI message, wherein the processing circuitry, when in operation, jointly decodes, from the parameter, the minimum cross-slot time-domain scheduling parameter and the trigger,
  wherein the aperiodic repot is an aperiodic channel state information report, and the reference signal is a sounding reference signal.

7. The UE according to claim 1, wherein
  the UE uses a default or upper bound value for one or more of a frequency bandwidth part, a maximum Multiple Input, Multiple Output (MIMO), a layer number, antenna panel, or downlink control channel monitoring skipping time, wherein the default minimum cross-slot time-domain scheduling parameter is configured by the base station, using a message of the Radio Resource Control protocol.

8. The UE according to claim 1, wherein the minimum cross-slot time-domain scheduling parameter refers either to a minimum downlink cross-slot time-domain scheduling parameter or to a minimum uplink cross-slot time-domain scheduling parameter,
wherein the DCI message carrying the minimum cross-slot time-domain scheduling parameter is a power saving signal.

9. A base station comprising:
a transmitter, which in operation, transmits, to a user equipment (UE) a minimum cross-slot time-domain scheduling parameter, indicating a minimum amount of slots between a scheduling downlink control information (DCI) and an uplink or downlink transmission scheduled by the scheduling DCI, the minimum cross-slot time domain scheduling parameter being carried by a DCI message, and
processing circuitry, which in operation, determines an updating time at which a previously-used minimum cross-slot time-domain scheduling parameter is to be updated based on the transmitted minimum cross-slot time-domain scheduling parameter,
wherein the processing circuitry, in operation, updates the previously-used minimum cross-slot time-domain scheduling parameter based on the transmitted minimum cross-slot time-domain scheduling parameter at the determined updating time,
wherein the updating time is determined based on a message exchanged between the UE and the base station, wherein the message relates to the DCI message carrying the minimum cross-slot time-domain scheduling parameter to be updated, and
wherein,
1) In case no feedback is received regarding the DCI message, carrying the minimum cross-slot time-domain scheduling parameter,
2) the previously-used minimum cross-slot time-domain scheduling parameter is updated based on a default minimum cross-slot time-domain scheduling parameter.

10. The base station according to claim 9, wherein
1) In case the minimum cross-slot time-domain scheduling parameter is transmitted in a scheduling DCI message, that schedules a downlink (DL) transmission,
2) In case a negative feedback of a retransmission protocol is received from the base station regarding the not correctly decoded downlink transmission,
3) The updating of the previously-received minimum cross-slate time-domain scheduling parameter is not performed by the processing circuitry, or
3) The updating time is determined to be after reception of the negative feedback of the retransmissions protocol.

11. The base station according to claim 9, wherein
1) In case the minimum cross-slot time-domain scheduling parameter is transmitted in a scheduling DCI message, that schedules a downlink transmission,
2) In case a positive feedback of a retransmission protocol is received regarding the not correctly decoded downlink transmission,
3) The updating time is determined to be after reception of the positive feedback of the retransmission protocol, or 3) The updating time is determined to be after transmitting, from the base station, a second scheduling DCI message to the UE, indicating that a positive feedback of a retransmission protocol, transmitted by the UE to the base station regarding the correctly decoded downlink transmission, was correctly received by the base station, or
3) The updating time is determined to be after transmitting, from the base station, a second scheduling DCI message to the UE, indicating that a second downlink transmission, scheduled by the second scheduling DCI message, refers to new data and to a retransmission protocol process that is the same as the one handling the transmitted downlink transmission.

12. The base station according to claim 9,
1) In case the minimum cross-slot time-domain scheduling parameter is transmitted in a scheduling DCI message, that schedules an uplink transmission,
2) The updating time is determined to be after receiving the uplink transmission scheduled by the UL-scheduling DCI message from the UE, or
2) The updating time is determined to be after transmitting, from the base station to the UE, a second scheduling DCI message, indicating that the uplink transmission, transmitted by the UE to the base station as scheduled by the UL-scheduling DCI message, was correctly received by the base station, or
2) The updating time is determined to be after transmitting, from the base station to the UE, a second scheduling DCI message, indicating that a second uplink transmission, scheduled by the second scheduling DCI message, refers to new data and to a retransmission protocol process that is the same as the one handling the uplink transmission.

13. The base station according to claim 9, wherein
1) In case the minimum cross-slot time-domain scheduling parameter is not transmitted in a scheduling DCI message, that schedules an uplink or downlink transmission, but in a DCI message that includes a trigger for an aperiodic report or reference signal to be transmitted in the uplink from the UE to the base station,
2) The updating time is determined to be after receiving the triggered aperiodic report or reference signal in the uplink from the UE.

14. The base station according to claim 9, wherein
the base station uses a default or upper bound value for one or more of a frequency bandwidth part, a maximum Multiple Input, Multiple Output (MIMO), a layer number, antenna panel, or downlink control channel monitoring skipping time,
wherein the default minimum cross-slot time-domain scheduling parameter is configured by the base station at the UE, using a message of the Radio Resource Control protocol.

15. A method comprising the following steps performed by a user equipment (UE):
receiving, from a base station, a minimum cross-slot time-domain scheduling parameter, indicating a minimum amount of slots between a scheduling downlink control information (DCI) and an uplink or downlink transmission scheduled by the scheduling DCI, the minimum cross-slot time domain scheduling parameter being carried by a DCI message,
determining an updating time at which a previously-received minimum cross-slot time-domain scheduling parameter is to be updated based on the received minimum cross-slot time-domain scheduling parameter, and updating the previously-received minimum cross-slot time-domain scheduling parameter based on the received minimum cross-slot time-domain scheduling parameter at the determined updating time, wherein the updating time is determined based on a message exchanged between the UE and the base station, wherein the message relates to the DCI message carrying the minimum cross-slot time-domain scheduling parameter to be updated, and wherein, 1) In case the DCI message, carrying the minimum cross-slot time-domain scheduling parameter is not correctly decoded,
    2) Updating the previously-received minimum cross-slot time-domain scheduling parameter based on a default minimum cross-slot time-domain scheduling parameter.

* * * * *